United States Patent
Palmer, Jr. et al.

(10) Patent No.: US 9,371,435 B2
(45) Date of Patent: *Jun. 21, 2016

(54) ADDITIVES TO RESIN COMPOSITIONS FOR IMPROVED IMPACT STRENGTH AND FLEXIBILITY

(71) Applicant: Ethox Chemicals, LLC, Greenville, SC (US)

(72) Inventors: Charles Francis Palmer, Jr., Greer, SC (US); Gerald Vandezande, Raleigh, NC (US)

(73) Assignee: Ethox Chemicals, LLC, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/259,132

(22) Filed: Apr. 22, 2014

(65) Prior Publication Data

US 2014/0348776 A1 Nov. 27, 2014

Related U.S. Application Data

(60) Provisional application No. 61/814,619, filed on Apr. 22, 2013.

(51) Int. Cl.
| | |
|---|---|
| *C08K 5/13* | (2006.01) |
| *C08K 3/20* | (2006.01) |
| *C09D 7/00* | (2006.01) |
| *C09D 5/16* | (2006.01) |
| *C08K 7/14* | (2006.01) |
| *C08L 95/00* | (2006.01) |
| *C04B 26/14* | (2006.01) |
| *C08K 5/05* | (2006.01) |
| *C08K 7/06* | (2006.01) |
| *C08L 101/06* | (2006.01) |
| *C08L 63/00* | (2006.01) |

(52) U.S. Cl.
CPC . *C08K 5/13* (2013.01); *C04B 26/14* (2013.01); *C08K 3/20* (2013.01); *C08K 5/05* (2013.01); *C08K 7/06* (2013.01); *C08K 7/14* (2013.01); *C08L 63/00* (2013.01); *C08L 95/00* (2013.01); *C08L 101/06* (2013.01); *C09D 5/1687* (2013.01); *C09D 7/001* (2013.01); *Y10T 428/1355* (2015.01); *Y10T 428/31529* (2015.04); *Y10T 428/31605* (2015.04)

(58) Field of Classification Search
USPC .......................................................... 524/349
See application file for complete search history.

(56) References Cited

U.S. PATENT DOCUMENTS

| | | | | |
|---|---|---|---|---|
| 5,145,568 | A * | 9/1992 | Chung et al. ................... 524/86 |
| 6,518,354 | B1* | 2/2003 | Suzuki et al. ................. 524/575 |
| 2002/0014412 | A1* | 2/2002 | December ................ B05D 1/36 204/484 |
| 2002/0150755 | A1* | 10/2002 | Kobayashi et al. ........... 428/364 |
| 2003/0096905 | A1* | 5/2003 | Tazzia .................. C09D 5/4411 524/800 |
| 2003/0181557 | A1* | 9/2003 | Suzuki et al. ................. 524/334 |
| 2004/0138075 | A1* | 7/2004 | Brown ................. C10M 159/12 508/223 |

(Continued)

FOREIGN PATENT DOCUMENTS

CN WO 2012071732 A1 * 6/2012 ............ C08G 77/62

*Primary Examiner* — Randy Gulakowski
*Assistant Examiner* — Christopher M Rodd
(74) *Attorney, Agent, or Firm* — Joseph T. Guy; Perkins Law Firm, LLC

(57) ABSTRACT

The invention provides a composition comprising: (a) about 0% to 99% by weight of at least one resin wherein the resin is selected from the group consisting of epoxy, latex, polyurethane, polyurea, polyspartic, or alkyd resins; (b) about 1%-99% by weight of tristyrenated phenol or distyrenated phenol; and (c) optionally about 2% to 98% by weight of an additional solvent.

34 Claims, 1 Drawing Sheet

(56) References Cited

U.S. PATENT DOCUMENTS

| | | | |
|---|---|---|---|
| 2006/0140772 A1* | 6/2006 | McMillan | F01D 5/147 416/241 R |
| 2009/0005478 A1* | 1/2009 | Gelbin et al. | 524/186 |
| 2012/0172493 A1* | 7/2012 | Dettloff et al. | 523/427 |
| 2014/0256852 A1* | 9/2014 | Vandezande et al. | 523/400 |
| 2014/0256862 A1* | 9/2014 | Palmer et al. | 524/148 |

* cited by examiner

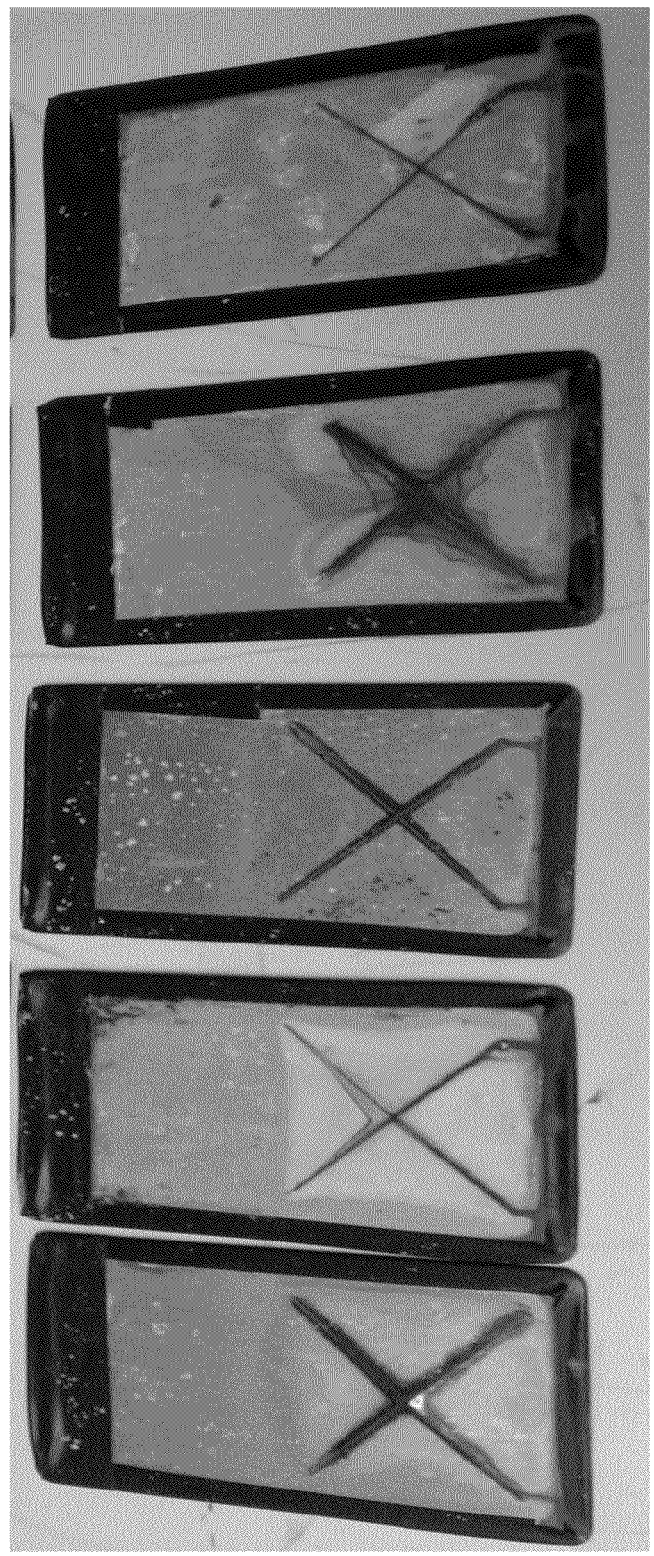

ADDITIVES TO RESIN COMPOSITIONS FOR IMPROVED IMPACT STRENGTH AND FLEXIBILITY

This application claims the priority benefit under 35 U.S.C. section 119 of U.S. Provisional Patent Application No. 61/814,619 entitled "Additives To Epoxy Coatings For Improved Impact Strength And Flexibility" filed on Apr. 22, 2013, which is in its entirety herein incorporated by reference.

FIELD OF THE INVENTION

The present invention is directed to additives that improve the chemical and physical properties of resin compositions. The invention also relates to modified resins, a process for its production and also its use for the production of shaped thermosetting plastics with improved chemical properties, fracture resistance, especially impact resistance as well as flexibility.

The present invention also relates to epoxy resins, water borne epoxy resin dispersions and epoxy hardeners. The invention also relates to improved aqueous dispersions of epoxy resins, which provide improved properties and a process to prepare such dispersions. This invention also relates to a novel aqueous epoxy resin dispersions incorporating novel additives such as styrenated phenols.

This invention further relates to epoxide resin hardening agents. The present invention also describes certain hardening agents and to a method for making epoxide polyadducts therewith, and to the polyadducts so made. The instant invention also relates to hardeners characterized by a relatively long pot life and relatively short hardening time.

The invention also relates to novel compositions incorporating the additives of the invention for use in a multitude of coatings applications as well as to make composites.

BACKGROUND OF THE INVENTION

The starting products or prepolymers or resins which are within the scope of the present invention are liquid or plastic before and during the processing and shaping processes. Following the traditional shaping and processing, as a result of polyreaction (polymerization, poly-condensation, polyaddition), yields thermosetting plastics. A three-dimensional, crosslinked, hard, non-melting resin, the thermosetting plastic, is obtained by the polyreaction, and the thermosetting plastic thus differs basically from traditional the thermoplastic which can be liquified and/or plasticized repeatedly by reheating.

As a result of the very high density of crosslinking, the crosslinked reaction resins have a number of valuable properties, which provide the reason that they, along with the thermoplastics, are the most used polymers. These valuable properties especially include hardness, strength, chemical resistance and temperature durability. Because of these properties, these reaction resins are used for various purposes, for instance for the production of fiber-reinforced plastics, for insulation materials used in electrotechnology, for the production of structural adhesives, laminated plastics, annealing lacquers, coatings and the like.

In addition to these advantageous properties, thermosetting plastics have one serious drawback, which in many cases prevents their use. As a result of the highly crosslinked state, they are very brittle and have a low impact resistance. This appears especially in the range of low temperatures, in other words at temperatures below 0° C., so that, for uses wherein the polymer is to be subjected to high mechanical stresses at low temperatures, especially impact stresses, the thermoplastic polymers generally have the advantage, whereby the drawbacks connected therewith, such as lower heat deformation resistance and chemical resistance, must be taken into consideration.

Since this drawback is not particularly favorable, there have been many attempts in the past to improve the impact resistance or flexibility of thermosetting plastics. Thus, it is already known, for instance, to mix reaction resins with fiber fillers, in order to increase the impact resistance. The improvements which are thus obtained are nonetheless quite limited. The addition to resins of powdered, soft filler material, such as powdered rubber or soft elastic plastic powder, is also known. The particle dimensions of such powdered additives is in the range of approximately 0.04 to 1 mm, which obviously does not suffice to improve such reaction resins to the desired degree, and which therefore enhance the drawbacks relative to other important properties required for technical use of this sort of modified thermosetting plastic.

Attempts have been made to improve the impact resistance of cross-linked reaction resins by addition of softeners. The added softeners do not react with the reaction resin, but rather as a result of layering, cause a widening of the network of thermosetting plastics and with that a certain softening of the material. A remarkable improvement of the impact resistance can actually be attained in this manner, which however unfortunately results in a limitation of the outlay which is required for the quality of other essential features of the thermosetting plastics.

Therefore, with the use of softeners, a latent danger exists of migration occurring following the cross-linking of the reaction resin or with further aging, with the negative results inherent therein for the surface properties of the material, such as the adherence, spreadability, polish and the like.

Furthermore, attempts have also been made to increase the elasticity of thermosetting plastics, in that chain lengtheners are added, which are incorporated into the network with the hardening process and lower the density of cross-linking Epoxy resins for instance could be elasticized according to this principle by addition of epoxidized soybean oil, dimeric fatty acids or epoxy-functional polyglycol ethers. Since the improvement in elasticity, however, is attained by a decrease of the cross-linking density, desirable properties such as hardness, chemical resistance or temperature durability are affected. This solution therefore has led to results which were not totally satisfactory.

It is also known to use liquid or solid, but uncross-linked butadiene-acrylonitrile rubbers (nitrile rubber, NBR) as additives to improve the viscosity of the reaction resins. These nitrile rubbers contain functional groups which can be reacted with the reaction resin with the cross-linking process or even in a previous reaction. The remarkable feature of these modifiers as compared with those cited as being used until now resides in that they are actually miscible with the uncross-linked reaction resin, and a phase separation nonetheless takes place during the cross-linking of the reaction resin, in which the rubber phase is deposited in the form of fine droplets. As a result of the reaction of the functional groups located on the surface of the nitrile rubber particles with the reaction resin, a solid connection of the rubber phase with the thermosetting plastic matrix is formed.

This type of modification of reaction resins is actually more advantageous because the effect is attained not by simply lowering the network density, but rather by formation of a separate soft phase with the result that the other advantageous properties of the thermosetting plastics are not influenced quantitatively by the modifier, as is the case with the measures which were formerly used. Unfortunately, however, such thermosetting plastics modified with nitrile rubber have notable problems. For instance, the heat resistance of thermosetting plastics modified with nitrile rubber is notably decreased and because of that, their capacity for use at high temperatures is questionable. This is also true of many electric properties, such as for example the dielectric strength or breakdown resistance. Because of the relatively good compatibility of the nitrile rubber with most reaction resins, especially with epoxy resins, a certain portion of the rubber does not participate in the phase separation during the cross-linking and is incorporated into the resin matrix. The density of the cross-linked reaction resin is thereby lowered with the already noted negative results for the configuration of the properties of the completed thermosetting plastics. Another drawback is the very high viscosity of the nitrile-rubber modifiers, which leads to processing problems and which negatively influences the flow properties of the modified reaction resin Additionally, it is known that epoxy resins contain a number of the reactive oxirane ring structures commonly called "epoxy." The most commonly used resins are derivatives of bisphenol A and epichlorohydrin shown in structure below. However, other types of resins (for example bisphenol F type) are also common to achieve various properties.

ity reduction of the epoxy coating. An alternative zero volatile organic compound (VOC)-free epoxy viscosity modifier would be advantageous and preferential over benzyl alcohol.

Benzyl alcohol is also used to improve epoxy reactions by compatibilizing the amine hardener and epoxy. This also helps reduce amine blush. In one aspect of the invention, using certain members of a family of distyryl phenol, tristyryl phenol or cumylphenol ethoxylate-based products as additives to epoxy resins without water reduce the viscosity and modify the pot life and cure time as well as reducing or eliminating amine blush. These additives impart no or very low VOCs to the epoxy coating formulation.

Epoxy resins can alternately be dispersed in water to reduce viscosity without adding VOCs. One technical problem that arises is that epoxy resins are rather hydrophobic, and thus do not readily disperse in water. Therefore, surfactants were developed in the past that would disperse these hydrophobic resins in water. These dispersed resins, however, are not freeze/thaw stable.

Waterborne epoxy resins have been in the marketplace for many years. They are widely accepted as environmentally friendly alternatives to solvent-borne or high solids epoxy systems. They offer distinct advantages over solvent-based epoxy coatings for a number of environmental, safety, and health considerations. They have a lower or zero volatile organic compound (VOC) content which reduces their carbon

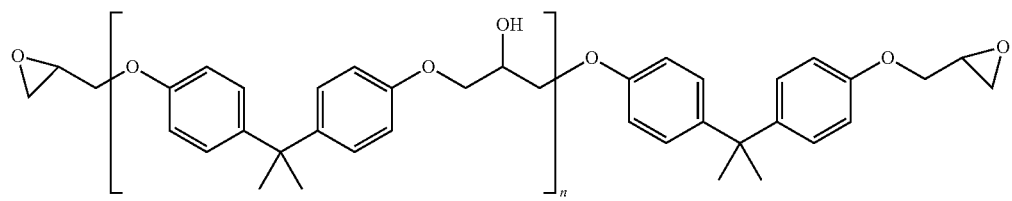

Epoxy coatings are formed by the reaction of a poly(epoxide)-based oligomer or resin with a polyfunctional active hydrogen compound hardener or curing agent. This curing reaction crosslinks the epoxy resin polymer and solidifies it into a durable coating. The focus of this invention is two component or 2K systems, with separate epoxy and polyamine hardeners (a polyamine pre-reacted with some epoxy or dimer fatty acid curing agent).

Organic solvents have been used to manage viscosity and maintain compatibility between the epoxy resin and hardener components, but are VOCs. Water use is more environmentally friendly, but requires surfactants since epoxy resins are hydrophobic and water reactive and therefore incompatible with water.

Epoxy resins are also available in various molecular weights to provide unique properties to the final coating. Epoxy molecular weights of about 300 Daltons are generally liquid at room temperature; those of 500 molecular weight are semi-solid, while those of 700 and above are solid in the absence of solvent. Molecular weights much higher than those listed are also used. Epoxy resins also include hybrids such as epoxy alkyds, epoxy acrylics, epoxy silicone, epoxy silane, epoxy polyurethane, epoxy urethanes, and other modifications are also known. In order to reduce the viscosity of these epoxy resins and 2K blends to a typical viscosity for epoxy coating application of around 2000-4000 cps, dilution with a solvent is often needed. Benzyl alcohol is traditionally used to lower viscosity in solvent epoxy applications. This traditionally requires around 10% benzyl alcohol for viscosfootprint. Lower VOC formulations reduce air pollution and lead to lower odor, improving customer acceptance. Lower VOCs also contribute to decreased flammability and thus improved safety.

Beyond environmental benefits, waterborne epoxy dispersions also provide further technical advantages to the formulator and applicator. The water-based attribute of these epoxy resin dispersions allows water cleanup. Compared to high solids or 100% solids epoxy formulations, they have significantly lower viscosity contributing to ease of use. These water-dispersed epoxy resins can also be produced at higher molecular weight while maintaining low viscosity, improving flexibility over metal as compared to their high solids or 100% solids counterparts. These high molecular weight epoxy resins also improve set time or walk-on time as compared to solvent-based or high solids epoxies due to their ability to "lacquer dry." The most important applications for water-based epoxy systems today are coatings on concrete, primers for metal and epoxy cement concrete (ECC).

However, one of the problems with low-VOC waterborne epoxy and hardener dispersions is that the freeze/thaw stability of these dispersions is often poor since common antifreeze solvents such as propylene glycol are VOCs. Another aspect of the instant invention provides a surfactant system comprising ethoxylates of distyrylphenol, tristyrylphenol or cumylphenol that imparts good freeze/thaw stability to epoxy dispersions. In addition, the stability and pot life of the dispersions are improved, without a concomitant extension of the cure time. This is unusual since pot life and cure time cannot usually be improved simultaneously. Gloss and water resistance of the cured coatings were checked and are good.

In addition, these distyrylphenol, tristyrylphenol or cumylphenol-based ethoxylate surfactants allow the preparation of aqueous epoxy resin dispersions that have good long-term stability at room temperature as well as at elevated temperatures. These dispersions are quite stable, retaining consistent viscosity over extended periods. They also impart good freeze/thaw resistance.

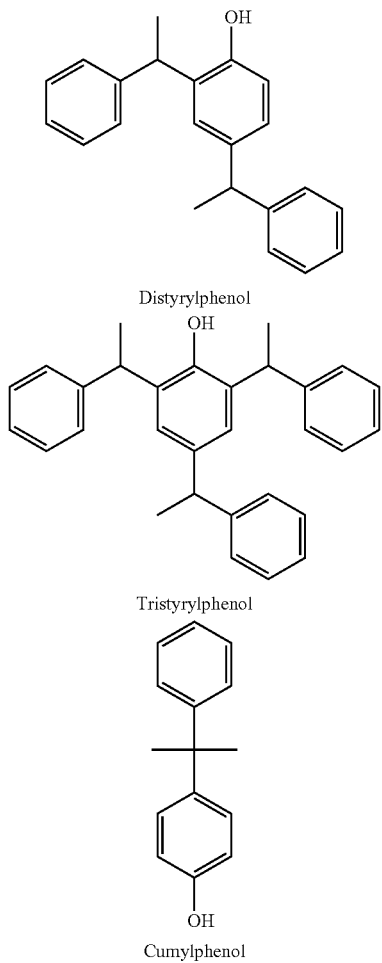

Distyrylphenol

Tristyrylphenol

Cumylphenol

These hydrophobes may be converted into surfactants by methods known in the art such as ethoxylation (nonionic), or by ethoxylation followed by either phosphation or sulfonation to produce anionic end groups which in turn can be neutralized resulting in a counterion cation of sodium, potassium or ammonium.

It is known that surfactants such as those listed in U.S. Pat. No. 6,221,934 may be employed to render the epoxy component emulsifiable. These are nonylphenol ethoxylates, alkylphenol initiated poly(oxyethylene) ethanols, alkylphenol initiated poly(oxypropylene)poly(oxyethylene) ethanols, and block copolymers containing an internal poly(oxypropylene) block and two external poly(oxyethylene) ethanol blocks. In this patent, it is explained that these surfactants do not produce good epoxy dispersions for various end use applications. None of these surfactants are known to produce good freeze-thaw properties in epoxy dispersions. No surfactants are mentioned that use distyryl phenol, tristyryl phenol or cumylphenol hydrophobes.

U.S. Pat. No. 6,271,287B1 cites the use of various surfactants employed in epoxy dispersions. These include long-chain alkyl alkali metal sulfosuccinate such as dioctyl sodium sulfosuccinate, sodium lauryl sulfate, sulfosuccinic acid-4-ester with polyethylene glycol dodecyl ether disodium salt, dialkyl disulfonated diphenyloxide disodium salt. None of these surfactants were shown to produce good freeze-thaw properties in epoxy dispersions. None of the surfactants mentioned use distyryl phenol, tristyryl phenol or cumylphenol hydrophobes.

When epoxy dispersions freeze, ice begins to form within the continuous phase. Thereby the continuous phase expands in volume, or, in other words, the emulsion becomes more concentrated. The pressure on the dispersed droplets increases considerably, and the ice crystals can violate the protective surfactant layer around the emulsion particles. This leads to coalescence of the emulsion droplets, destabilization of the dispersion and separation of the water and epoxy, resulting in a poor coating.

It would therefore be an advantage in the art to discover a waterborne epoxy resin with good freeze-thaw stability.

Finally, another of the problems with state-of-the-art hardeners and waterborne epoxy dispersion mixtures used in coatings, adhesives, damping and other products including epoxy cement concrete coatings, coatings for concrete, primers for metal and other applications is that often the pot life (the usable life of a mixture of an epoxy hardener and an epoxy) is correlated strongly to the cure time (time for the applied material to cure). Thus, if the pot life is very long, so is the cure time. However, a long pot life is desired allowing larger batches to be made, while shorter cure times are desired to allow for earlier use of the finished coated product. It is difficult to simultaneously increase pot life while maintaining or decreasing cure time.

There are few options to increase pot life while maintaining or reducing cure time. One such option is to add acetic acid to enhance pot life; this is undesirable since this adds to the VOC (volatile organic compounds) level. VOCs are being reduced or eliminated in current and future coatings formulations. Acetic acid may also add undesired water sensitivity to the final epoxy coating.

It is known that nonyl phenols are used in hardener applications to modify cure time. Nonyl phenols are used in hardeners such as Ancamine 2368 available from Air Products. In epoxy hardener systems, these traditionally are used to increase compatibility with epoxy materials which decreases cure time but also simultaneously decreases pot life, an undesirable combination. These nonyl phenols are also estrogen mimics and are banned for use in coatings and other uses by many countries.

The reaction adduct of 1,3-bis(aminomethyl)cyclohexane (BAC) with ketones is used but produces inconsistent results. Ketimines are the reaction products of ketones and primary aliphatic amines. In the absence of reactive hydrogens, they do not react with epoxy resins. They can be considered blocked amines or latent hardeners, since they are readily hydrolyzed to regenerate the amines. They have low viscosity, long pot lives and cure rapidly when exposed to atmospheric humidity, and are useful in high solids coatings. Unfortunately, these cannot be used in waterborne coatings due to premature unblocking with water. They also contribute to VOCs and require an added step in the formulation of hardeners.

U.S. Pat. No. 6,271,287B1 cites the use of various surfactants employed in epoxy dispersions. These include long-chain alkyl alkali metal sulfosuccinate such as dioctyl sodium sulfosuccinate, sodium lauryl sulfate, sulfosuccinic acid-4-ester with polyethylene glycol dodecyl ether disodium salt, dialkyl disulfonated diphenyloxide disodium salt. None of these surfactants were shown to produce improved combination of long pot life and short cure times. None of the surfactants mentioned use distyryl phenol, tristyryl phenol or cumylphenol hydrophobes.

It would therefore be an advantage in the art to discover an ingredient in a hardener that would simultaneously increase pot life while maintaining or decreasing cure time.

Epoxy thermosets derive their thermal, chemical, and mechanical properties from the highly cross-linked networks. Highly cross-linked epoxy thermosets sometimes suffer from brittleness. Consequently, toughness deficiency is an issue in certain applications. To improve the impact resistance and toughness of epoxy systems, elastomers such as BF Goodrich's CTBN rubbers (carboxyl-terminated butadiene nitrile) are often used as additives or pre-reacted with epoxy resins. Most commonly used products are reaction adducts of liquid epoxy resins (such as DGEBA) with CTBN in concentrations ranging from 5 wt % to 50 wt %. They have been shown to give improved toughness, peel adhesion, and low temperature flexibility over unmodified epoxies.

Primary applications are adhesives for aerospace and automotive and as additives to epoxy vinyl esters for structural composites. Formation of adducts of epoxy resins and carboxylated butadiene-acrylonitrile copolymers (CTBN) is promoted by triphenylphosphine or alkyl phosphonium salts. Other elastomers used to modify epoxies include amine-terminated butadiene nitrile (ATBN), maleated polybutadiene and butadiene-styrene, epoxy-terminated urethane prepolymers, epoxy-terminated polysulfide, epoxy-acrylated urethane, and epoxidized polybutadiene.

A patent by Dow using EO/PO type materials WO 2006/052725 (angres) relates to ambient cure high-solids epoxy resin compositions modified with amphilic polyether block copolymers to increase the fracture resistance or toughness of the cured ambient cure high solids coating composition.

Distyryl phenol, tristyryl phenol or cumylphenol based additives have not been cited in the patent literature or other published literature for use in producing epoxy resin hardeners. These distyryl phenol, tristyryl phenol or cumylphenol based additives have surprisingly been found to improve both the pot life and cure times of epoxy/hardener systems. Pot life can be increased while cure time is maintained or decreased.

Objects of the Invention

The object of the invention is to provide additives based on distyrenated phenols and tristyrenated phenols that provide improved performance.

BRIEF DESCRIPTION OF THE FIGURES

FIG. 1 shows the advantage of tristyrenated phenol in preventing corrosion.

SUMMARY OF THE INVENTION

The invention provides a composition comprising: (a) a polymeric resin; and (b) an additive of the formula I

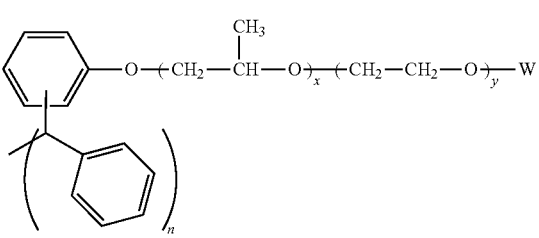

wherein n=1, 2 or 3 or mixtures thereof, x=0-200, y=0-200, W is selected from the group consisting of H, sulfate ($-SO_3^- M^+$), phosphate ($-PO_3H$, $-PO_3^-M^+$ or $-PO_2-OX_mR$) where $M^+$ is an alkali metal or alkaline earth metal, OX represents units derived from ethylene oxide or propylene oxide or a combination of both, R is a $C_1$-$C_{22}$ alkyl, m=0-200; and wherein said additive is present in an effective amount to enhance the chemical and physical properties of said polymeric resin.

The invention is also directed to a hardener or epoxy curing agent composition comprising: (a) at least one epoxy curing agent; and (b) an additive of the formula I

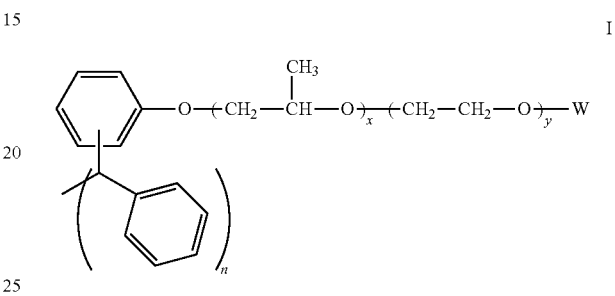

wherein n=1, 2 or 3 or mixtures thereof, x=0-200, y=0-200, W is selected from the group consisting of H, sulfate ($-SO_3^- M^+$), phosphate ($-PO_3H$, $-PO_3^-M^+$ or $-PO_2-OX_mR$) where $M^+$ is an alkali metal or alkaline earth metal, OX represents units derived from ethylene oxide or propylene oxide or a combination of both, R is a $C_1$-$C_{22}$ alkyl, and m=0-200.

The invention is also a composition comprising: (a) about 1% to 99% by weight at least one resin wherein the resin is selected from the group consisting of epoxy, latex, polyurethane, or alkyd resins; (b) about 1%-99% by weight of tristyrenated phenol or distyrenated phenol; and (c) optionally about 2% to 98% by weight of an additional solvent.

The present invention also provides a composition useful for polymer industrial applications comprising: (a) effective amounts a surfactant selected from the group consisting of anionic, nonionic, cationic, amphoteric and zwitterionic surfactants; and (b) effective amounts of a distyrenated phenol or a tristyrenated phenol.

DETAILED DESCRIPTION OF THE INVENTION

The present invention is directed to a composition comprising: (a) about 0% to 99% by weight of a polymeric resin; and (b) about 1% to 100% by weight of an additive of the formula

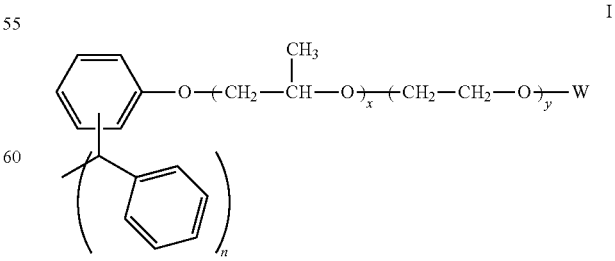

wherein n=1, 2 or 3 or mixtures thereof, x=0-200, y=0-200, W is selected from the group consisting of H, sulfate ($-SO_3^-$ $M^+$), phosphate (—$PO_3H$, —$PO_3^-M^+$ or —$PO_2$—$OX_mR$) where $M^+$ is an alkali metal or alkaline earth metal, OX represents units derived from ethylene oxide or propylene oxide or a combination of both, R is a $C_1$-$C_{22}$ alkyl, m=0-200; and wherein said additive is present in an effective amount to enhance the chemical and physical properties of said polymeric resin.

The polymeric resin of the invention may be a thermosetting resin or a thermoplastic resin. The thermosetting resins useful in the practice of the invention are selected from the group consisting of polyesters, polyurethanes, vulcanized rubber, phenol-formaldehyde resins, urea-formaldehyde resins, vinyl esters, polybenzoxazines, bismaleimides, melamine resins, melamine formaldehyde resins, epoxy resins, polyimides, silicone; polyamide-imide. and cyanate esters or polycyanurates.

The thermoplastic resins useful in the practice of the invention are selected from the group consisting of polyethylene terephthalate, polyproplyene, polycarbonate, polybutylene terephthalate, vinyl polymers, polyethlene, polyvinyl chloride and polyamide.

The invention is also directed to an epoxy hardener or curing agent composition comprising: (a) at least one epoxy hardener or curing agent; and (b) an additive of the formula I

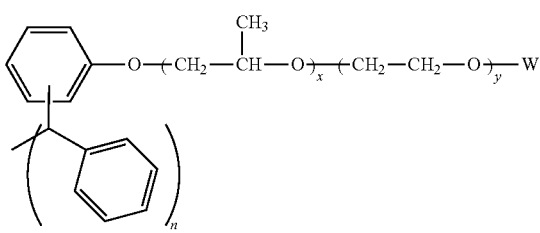

I wherein n=1, 2 or 3 or mixtures thereof, x=0-200, y=0-200, W is selected from the group consisting of H, sulfate (—$SO_3^-$ $M^+$), phosphate (—$PO_3H$, —$PO_3^-M^+$ or —$PO_2$—$OX_mR$) where $M^+$ is an alkali metal or alkaline earth metal, OX represents units derived from ethylene oxide or propylene oxide or a combination of both, R is a $C_1$-$C_{22}$ alkyl, and m=0-200.

The hardener or curing agent of the invention is selected from the group consisting of amines, diamines, triamines and other polyamines, anhydrides, thiols, dithiols, phenols and polyphenols.

The amine curing agents typical contains two or more amino groups in the molecule and they could me primary or secondary amine groups. The amine (NH2) groups react with the epoxide groups of the resin during polymerisation. Polyfunctional primary amines form an important class of epoxy hardeners. Primary amines undergo an addition reaction with the epoxide group to form a hydroxyl group and a secondary amine. The secondary amine can further react with an epoxide to form a tertiary amine and an additional hydroxyl group. Kinetic studies have shown the reactivity of the primary amine to be approximately double that of the secondary amine. Use of a difunctional or polyfunctional amine forms a three-dimensional cross-linked network. Aliphatic, cycloaliphatic and aromatic amines are all employed as epoxy hardeners. Amine type will alter both the processing properties (viscosity, reactivity) and the final properties (mechanical, temperature and chemical resistance) of the cured copolymer network. Thus amine structure is normally selected according to the application. Reactivity is broadly in the order aliphatic amines>cycloaliphatic amines>aromatic amines. Temperature resistance generally increases in the same order, since aromatic amines form much more rigid structures than aliphatic amines. Whilst aromatic amines were once widely used as epoxy resin hardeners due to the excellent end properties they imparted, health concerns with handling these materials means that they have now largely been replaced by safer aliphatic or cycloaliphatic alternatives.

Amine curing agents include Diethylenetriamine, Triethylenetetramine, Poly(oxypropylenediamine), Poly(oxypropylenetriamine), Poly(glycol amine), NAminoethylpiperazine, Isophorone diamine, 1,2-Diaminocyclohexane, Bis(4-aminocyclohexyl) methane, 4,4-Diaminodiphenylmethane, 4,4-Diaminodiphenyl sulfone, 4,4-DDS m-Phenylenediamine, Diethyltoluenediamine, meta-Xylene diamine, 1,3-Bis(aminomethyl cyclohexane) and modifications thereof.

Modifications include but are not limited to, Amine functional compounds, Aliphatic amines and adducts, Polyamides, Amidoamines, Cycloaliphatic amines, Phenalkamines, Dicyandiamide (DICY), Aromatic polyamines, Carboxylics, Polycarboxylic polyesters, Anhydrides, Resole resins, Amino formaldehydes, Phenol formaldehyde, Novolacs and other phenolics, Polysulfides and polymercaptans.

Other Examples of diamines to be used in the present invention include orthoxylylenediamine, metaxylylenediamine, paraxylylenediamine, 1,2-bis(aminomethyl)-cyclohexane, 1,3-bis(amino-methyl)cyclohexane, and 1,4-bis (aminomethyl)cyclohexane, among which metaxylylenediamine and 1,3-bis(aminomethyl)cyclohexane are particularly preferable. Each of them may be used individually or blends of them may be used.

Further, other polyamino compounds may be mixed with the above diamines. Examples of other polyamino compound to be mixed with diamine include aliphatic polyamines such as ethylenediamine, diethylenetriamine, triethylenetetramine, hexamethylenediamine and polyoxy-alkylenepolyamine; alicyclic polyamines such as isophorone-diamine, norbornanediamineu, 1,4-diaminocyclohexane and di(aminohexyl)methane; aromatic polyamines such as metaphenylene-diamine, diaminodiphenylmethane and diaminodiphenyl-sulfone and heterocyic polyamines such as N-aminoethylpiperazine and 3,9-bis(3-amino-propyl)-2,4,8, 10-tetraoxaspiro[5,5]-undecane.

Anhydrides such as cyclic anhydrides can also be used to cure the epoxy resins at elevated temperatures. Reaction occurs only after opening of the anhydride ring, e.g. by secondary hydroxyl groups in the epoxy resin. A possible side reaction may also occur between the epoxide and hydroxyl groups, but this may be suppressed by addition of tertiary amines. The low viscosity and high latency of anhydride hardeners makes them suitable for processing systems which require addition of mineral fillers prior to curing, e.g. for high voltage electrical insulators.

The acid anhydride is at least one member selected from the group consisting of phthalic anhydride, ($C_1$-$C_{20}$ alkyl) phthalic anhydrides, tetrahydrophthalic anhydride, ($C_1$-$C_{20}$ alkyl)tetrahydrophthalic anhydrides, hexahydrophthalic anhydride, ($C_1$-$C_{20}$ alkyl)hexahydrophthalic anhydrides, succinic anhydride, ($C_1$-$C_{20}$ alkyl)succinic anhydrides, ($C_2$-$C_{20}$ alkenyl)succinic anhydrides, HET acid anhydride, tetrabromophthalic anhydride, 3,6-endomethylenetetrahydrophthalic anhydride, hydrogenated 3,6-endomethylenetetrahydrophthalic anhydride, 3,6-endomethylenemethyltetrahydrophthalic anhydride, hydrogenated 3,6-endomethylenemethyltetrahydrophthalic anhydride, trimellitic anhydride, $C_1$-$C_{20}$ alkyl nucleally substituted trimellitic anhydride; pyromellitic dianhydride; benzophenonetetracarboxylic dianhydride, diphenyl-sulfonetetracarboxylic dianhydride, diphenyl ether tetracarboxylic dianhydride, butanetetra-carboxylic dianhydride, ethyleneglycolbis(anhydrotrimellitate), glyceroltristrimellitic anhydride, poly(ethyloctadecane diacid)anhydride, poly(phenylhexadecane diacid)anhydride, 1-isopropyl-4-methylbicyclo[2,2,0]octane-5-ene-2,3-dicarboxylic anhydride, hydrogenated 1 isopropyl-4-methylbicyclo[2,2,0]octane-5-ene-2,3-dicarboxylic anhydride, maleic-modified alloocimene, hydrogenated maleic-modified alloocimene, maleic-modified myrcene and hydro-genated maleic modified myrcene.

Polyphenols, such as bisphenol A or novolacs can also be used to harden or cure the epoxy resins at elevated temperatures (130-180° C.), normally in the presence of a catalyst. The resulting material has ether linkages and displays higher chemical and oxidation resistance than typically obtained by curing with amines or anhydrides. Since many novolacs are solids, this class of hardeners is often employed for powder coatings.

Thiols also known as mercaptans, thiols with the (S—H) functional group, contain an electron poor hydrogen which reacts very readily with the epoxide group, even at ambient or sub-ambient temperatures. While the resulting network does not typically display high temperature or chemical resistance, the high reactivity of the thiol group makes it useful for applications where heated curing is not possible, or very fast cure is required e.g. for domestic adhesives and chemical rock bolt anchors. Thiols have a characteristic odour, which can be detected in many two-component household adhesives.

The invention is also a composition comprising: (a) about 0% to 99% by weight at least one resin wherein the resin is selected from the group consisting of epoxy, latex, polyurethane, or alkyd resins; (b) about 1%-100% by weight of tristyrenated phenol or distyrenated phenol; and (c) optionally about 2% to 50% by weight of an additional solvent.

The present invention also provides a composition useful for polymer industrial applications comprising: (a) effective amounts a surfactant selected from the group consisting of anionic, nonionic, cationic, amphoteric and zwitterionic surfactants; and (b) effective amounts of a distyrenated phenol or a tristyrenated phenol.

Epoxy resins contain the reactive oxirane ring structure commonly called "epoxy". Epoxy resins react spontaneously with carboxylic acids, amines, amides, and mercaptans (thiols). Epoxy resins react slowly with anhydrides, alcohols, phenols, and other epoxy resins. All of these materials are used commercially to cure epoxy resins. Catalysts (tertiary amines, amine salts, boron trifluoride complexes, etc.) are sometimes used to accelerate the slower reactions. The most commonly used resins are derivatives of bisphenol A and epichlorohydrin. However, other types of resins (for example bisphenol F type) are also common to achieve various properties. Other resisn such as epoxy resins (SER), Bisphenol F epoxy, Multifunctional Phenol epoxy novolac, Cresol epoxy novolac, Cycloaliphatic epoxies, Brominated epoxies, Phenoxy resins, and epoxy diluentsare also used. Resins are also available in various molecular weights, to provide unique properties to the final coating. Epoxy molecular weights of about 300 are generally liquid at room temperature; those of 500 molecular weight are semi solid, while those of 700 and above are solid in the absence of solvent. Molecular weights much higher than those listed are also used. Epoxy resins also include hybrids such as epoxy alkyds, epoxy acrylics, epoxy silicone, epoxy silane, epoxy polyurethane, epoxy urethanes and other modifications known in the art.

The epoxy compounds or epoxy-containing compounds of the epoxy resin system of the polymerizable preparation of the invention can encompass both oligomeric and monomeric epoxy compounds as well as epoxies of the polymeric type, and can in principle represent aliphatic, cycloaliphatic, aromatic, or heterocyclic compounds. Suitable epoxy resins in the context of the present invention are, for example, preferably selected from epoxy resins of the bisphenol A type, epoxy resins of the bisphenol S type, epoxy resins of the bisphenol F type, epoxy resins of the phenol novolac type, epoxy resins of the cresol novolac type, epoxidized products of numerous dicyclopentadiene-modified phenol resins obtainable by the reaction of dicyclopentadiene with numerous phenols, epoxidized products of 2,2',6,6'-tetramethylbiphenol, aromatic epoxy resins such as epoxy resins having a naphthalene backbone and epoxy resins having a fluorene backbone, aliphatic epoxy resins, alicyclic epoxy resins such as 3,4-epoxycyclohexylmethyl-3,4-epoxycyclohexane carboxylate and bis(3,4-epoxycyclohexyl)-adipate, and epoxy resins having a hetero ring, such as triglycidyl isocyanurate. The epoxy resins encompass, in particular, octadecylene oxide, styrene oxide, vinylcyclohexene oxide, glycidol, vinylcyclohexene dioxide, 3,4-epoxycyclohexylmethyl-3,4-epoxycyclohexene carboxylate, 3,4-epoxy-6-methylcyclohexylmethyl-3,4-epoxy-6-methylcyclohexene carboxylate, bis(3,4-epoxy-6-methylcyclohexylmethyl)adipate, bis(2,3-epoxycyclopentyl)ether, dipentene dioxide, epoxidized polybutadiene (e.g. Krasol products of Sartomer), silicone resin comprising epoxide functionality, flame-retardant epoxy resins (e.g. "DER-580"), bis(3,4-epoxycyclohexyl)adipate, 2-(3,4-epoxycyclohexyl-5,5-spiro-3,4-epoxy)cyclohexanemetadioxane, vinylcyclohexene monoxide, and 2-epoxyhexadecane.

Other epoxy resins for purposes of the present invention are cycloaliphatic epoxy resins that are obtainable commercially, for example, under the trade name CY179 (Huntsman), ACHWL CER 4221 (Achiewell, LLC), or Cyracure 6105/6110 (Dow Chemical).

The epoxy resins furthermore encompass, for example, the reaction product of bisphenol A and epichlorohydrin, the reaction product of phenol and formaldehyde (novolac resins) and epichlorohydrin, glycidyl esters, and the reaction product of epichlorohydrin and p-aminophenol. Further polyphenols that yield suitable epoxy resin prepolymers by reaction with epichlorohydrin (or epibromohydrin) are: resorcinol, 1,2-dihydroxybenzene, hydroquinone, bis(4-hydroxyphenyl)-1,1-isobutane, 4,4'-dihydroxybenzophenone, bis(4-hydroxyphenyl)-1,1-ethane, and 1,5-hydroxynaphthalene.

Further suitable epoxy prepolymers are polyglycidyl ethers of polyalcohols or diamines. Polyglycidyl ethers of this kind are derived from polyalcohols such as, for example, ethylene glycol, diethylene glycol, triethylene glycol, 1,2-propylene glycol, 1,4-butylene glycol, triethylene glycol, 1,5-pentanediol, 1,6-hexanediol, or trimethylolpropane.

Further preferred epoxy resins that are commercially obtainable encompass, in particular, octadecylene oxide, epichlorohydrin, styrene oxide, vinylcyclohexene oxide, glycidol, glycidyl methacrylate, diglycidyl ethers of bisphenol A (e.g. those that are obtainable under the commercial designations "Epon 828", "Epon 825", "Epon 1004" and "Epon 1010" of Hexion Specialty Chemicals Inc., "DER-331", "DER-332", "DER-334", "DER-732" and "DER-736" of Dow Chemical Co.), vinylcyclohexene dioxide, 3,4-epoxycyclohexylmethyl-3,4-epoxycyclohexene carboxylate, 3,4-epoxy-6-methylcyclohexylmethyl-3,4-epoxy-6-methylcyclohexene carboxylate, bis(3,4-epoxy-6-methylcyclohexylmethyl)adipate, bis(2,3-epoxycyclopentyl)ether, aliphatic epoxide modified with polypropylene glycol, dipentene dioxide, epoxidized polybutadiene (e.g. Krasol products of Sartomer), silicone resins comprising epoxide functionality, flame-retardant epoxy resins (e.g. "DER-580", a brominated epoxy resin of the bisphenol type that is obtainable from Dow Chemical Co.), 1,4-butanediol diglycidyl ethers of a phenol/formaldehyde novolac (e.g. "DEN-431" and "DEN-438" of the Dow Chemical Co.), as well as resorcinol diglycidyl ethers (e.g. "Kopoxite" of the Koppers Company Inc.), bis(3,4-epoxycyclohexyl)adipate, 2-(3,4-epoxycyclohexyl-5,5-spiro-3,4-epoxy)cyclohexanemetadioxane, vinylcyclohexene monoxide, 1,2-epoxyhexadecane, alkyl glycidyl ethers such as, for example, $C_8$ to $C_{10}$ alkyl glycidyl ethers (e.g. "HELOXY Modifier 7" of Hexion Specialty Chemicals Inc.), $C_{12}$ to $C_{14}$ alkyl glycidyl ethers (e.g. "HELOXY Modifier 8" of Hexion Specialty Chemicals Inc.), butyl glycidyl ethers (e.g. "HELOXY Modifier 61" of Hexion Specialty Chemicals Inc.), cresyl glycidyl ethers (e.g. "HELOXY Modifier 62" of Hexion Specialty Chemicals Inc.), p-tert-butylphenyl glycidyl ethers (e.g. "HELOXY Modifier 65" of Hexion Specialty Chemicals Inc.), polyfunctional glycidyl ethers such as, for example, diglycidyl ethers of 1,4-butanediol (e.g. "HELOXY Modifier 67" of Hexion Specialty Chemicals Inc.), diglycidyl ethers of neopentyl glycol (e.g. "HELOXY Modifier 68" of Hexion Specialty Chemicals Inc.), diglycidyl ethers of cyclohexanedimethanol (e.g. "HELOXY Modifier 107" of Hexion Specialty Chemicals Inc.), trimethylolethane triglycidyl ethers (e.g. "HELOXY Modifier 44" of Hexion Specialty Chemicals Inc.), trimethylolpropane triglycidyl ethers (e.g. "HELOXY Modifier 48" of Hexion Specialty Chemicals Inc.), polyglycidyl ethers of an aliphatic polyol (e.g. "HELOXY Modifier 84" of Hexion Specialty Chemicals Inc.), polyglycol diepoxide (e.g. "HELOXY Modifier 32" of Hexion Specialty Chemicals Inc.), bisphenol F epoxies (e.g. "EPN-1138" or "GY-281" of Huntsman Int. LLC), 9,9-bis-4-(2,3-epoxypropoxy)phenylfluorenone (e.g. "Epon 1079" of Hexion Specialty Chemicals Inc.).

Other commercially obtainable compounds are selected, for example, from Araldite™ 6010, Araldit™ GY-281™, Araldit™ ECN-1273, Araldit™ ECN-1280, Araldit™ MY-720, RD-2 of Huntsman Int. LLC; DENT™ 432, DEN™ 438, DEN™ 485 of Dow Chemical Co., Epon™ 812,826, 830, 834, 836, 871, 872, 1001, 1031 etc. of Hexion Specialty Chemicals Inc. and HPT™ 1071, HPT™ 1079 likewise of Hexion Specialty Chemicals Inc., as novolac resins furthermore, for example, Epi-Rez™ 5132 of Hexion Specialty Chemicals Inc., ESCN-001 of Sumitomo Chemical, Quatrex 5010 of Dow Chemical Co., RE 305S of Nippon Kayaku, Epiclon™ N673 of DaiNipon Ink Chemistry, or Epicote™ 152 of Hexion Specialty Chemicals Inc.

Other resins suitable for the practice of the invention include the following:

Alkyd resins which are polyesters modified by the addition of fatty acids and other components. They are derived from polyols and a dicarboxylic acid or carboxylic acid anhydride. Alkyds are used in paints and in moulds for casting. They are the dominant resin or "binder" in most commercial "oil-based" coatings. There are two types of alkyd resins, drying (including semi-drying) and nondrying. Both types are typically produced from dicarboxylic acids or anhydrides, such as phthalic anhydride or maleic anhydride, and polyols, such as trimethylolpropane, glycerine, or pentaerythritol. Alkyds are also used in items such as resins and paints. For the "drying" resins, triglycerides are derived from polyunsaturated fatty acids (often derived from plant and vegetable oils, e.g. linseed oil). These drying alkyds are cured in air. The drying speed and the nature of the coatings depends on the amount and type of drying oil employed (more polyunsaturated oil means faster reaction in air) and use of metal salts, the so-called oil drying agents. These metal complex that catalyze crosslinking of the unsaturated sites.

Latex resins which are stable dispersions (emulsions) of polymer microparticles in an aqueous medium. Latexes may be natural or synthetic. They can be made synthetically by polymerizing a monomer such as styrene or acrylate esters that have been emulsified with surfactants. For this invention, synthetic latexes are meant. Examples of synthetic latexes are styrene-butadiene rubber, acrylonitrile butadiene rubber, acrylic polymers, and polyvinyl acetate. Synthetic latexes are used in coatings (e.g. latex paint) and glues because they solidify by coalescence of the polymer particles as the water evaporates, and therefore can form films without releasing potentially toxic organic solvents in the environment. Other uses include cement additives.

Polyurethane resins which are polymers composed of a chain of organic units joined by carbamate (urethane) links. While most polyurethanes are thermosetting polymers that do not melt when heated, thermoplastic polyurethanes are also available. Polyurethane polymers are traditionally and most commonly formed by reacting a di- or polyisocyanate with a polyol. Both the isocyanates and polyols used to make polyurethanes contain on average two or more functional groups per molecule. Polyurethanes are used in the manufacture of flexible, high-resilience foam seating; rigid foam insulation panels; microcellular foam seals and gaskets; durable elastomeric wheels and tires (such as roller coaster and escalator wheels); automotive suspension bushings; electrical potting compounds; high performance adhesives; surface coatings and surface sealants; synthetic fibers (e.g., spandex); carpet underlay; hard-plastic parts (e.g., for electronic instruments); hoses and skateboard wheels.

Polyureas are a type of elastomers that are derived from the reaction product of an isocyanate component and a synthetic resin blend component through step-growth polymerization. The isocyanate can be aromatic or aliphatic in nature. It can be monomer, polymer, or any variant reaction of isocyanates, quasi-prepolymer or a prepolymer. The prepolymer, or quasi-prepolymer, can be made of an amine-terminated polymer resin, or a hydroxyl-terminated polymer resin. The resin blend may be made up of amine-terminated polymer resins, and/or amine-terminated chain extenders. The amine-terminated polymer resins will not have any intentional hydroxyl moieties. Any hydroxyls are the result of incomplete conversion to the amine-terminated polymer resins. The resin blend may also contain additives, or non-primary components. These additives may contain hydroxyls, such as pre-dispersed pigments in a polyol carrier. In a polyurea, alternating monomer units of isocyanates and amines react with each other to form urea linkages.

Polyaspartic esters are a new type of amine-functional coreactant for aliphatic polyisocyanates. Polyaspartic chemistry was first introduced in the early 1990s making it a relatively new class of coating. Polyaspartic is actually an aliphatic polyurea because it is derived from the reaction product of an aliphatic polyisocyanate component and a polyaspartic ester component, which is a new type of amine/diamine functional coreactant for aliphatic polyisocyanate. Polyaspartic esters perform well as a reactive diluting agent for high solids polyurethane coatings. For this reason, polyaspartic esters initially found use in conventional solvent-borne two-component polyurethane coatings. Eventually, the advantages of using polyaspartic esters as the main component of the co-reactant for reaction with an aliphatic polyisocyanate in low to zero volatile organic compound (VOC) coatings has been realized.

When combining surfactants with the additives of the invention the surfactants may be anionic, nonionic, cationic or zwitterionic. Suitable anionic surfactants contain anionic functional groups at their head, such as sulfate, sulfonate, phosphate, and carboxylates. Prominent alkyl sulfates include ammonium lauryl sulfate, sodium lauryl sulfate (SDS, sodium dodecyl sulfate, another name for the compound) and the related alkyl-ether sulfates sodium laureth sulfate, also known as sodium lauryl ether sulfate (SLES), and sodium myreth sulfate. Docusates such as dioctyl sodium sulfosuccinate, perfluorooctanesulfonate (PFOS), perfluorobutanesulfonate, linear alkylbenzene sulfonates (LABs) can also be used. Other anionic include alkyl-aryl ether phosphates and the alkyl ether phosphate and carboxylates such as alkyl carboxylates (soaps), such as sodium stearate. More specialized species include sodium lauroyl sarcosinate and carboxylate-based fluorosurfactants such as perfluorononanoate, perfluorooctanoate (PFOA or PFO).

Suitable cationic surfactants include alkyltrimethylammonium salts such as cetyl trimethylammonium bromide (CTAB) also known as hexadecyl trimethyl ammonium bromide, cetyl trimethylammonium chloride (CTAC), cetylpyridinium chloride (CPC), benzalkonium chloride (BAC), benzethonium chloride (BZT), 5-Bromo-5-nitro-1,3-dioxane dimethyldiocta-decylammonium chloride, cetrimonium bromide and dioctadecyldimethylammonium bromide (DODAB).

Suitable nonionic surfactants include fatty alcohols such as cetyl alcohol, stearyl alcohol, and cetostearyl alcohol (consisting predominantly of cetyl and stearyl alcohols), and oleyl alcohol. Other non-ionic include polyoxyethylene glycol alkyl ethers i.e., $CH_3-(CH_2)_{10-16}-(O-C_2H_4)_{1-25}-OH$, octaethylene glycol monododecyl ether, pentaethylene glycol monododecyl ether, polyoxypropylene glycol alkyl ethers: $CH_3-(CH_2)_{10-16}-(O-C_3H_6)_{1-25}-OH$, glucoside alkyl ethers: $CH_3-(CH_2)_{10-16}-(O\text{-Glucoside})_{1-3}\text{-OH}$, decyl glucoside, lauryl glucoside, octyl glucoside, polyoxyethylene glycol octylphenol ethers, $C_8H_{17}-(C_6H_4)-(O-C_2H_4)_{1-25}-OH$, Triton X-100, polyoxyethylene glycol alkylphenol ethers: $C_9H_{19}-(C_6H_4)-(O-C_2H_4)_{1-25}-OH$, nonoxynol-9, glycerol alkyl esters, glyceryl laurate, polyoxyethylene glycol sorbitan alkyl esters, polysorbate, sorbitan alkyl esters, Spans, cocamide MEA, cocamide DEA, dodecyldimethylamine oxide, block copolymers of polyethylene glycol and polypropylene glycol, poloxamers, and polyethoxylated tallow amine (POEA).

Suitable zwitterionic surfactants include (3-[(3-Cholamidopropyl)dimethylammonio]-1-propanesulfonate), cocamidopropyl hydroxysultaine, cocamidopropyl betaine and lecithin.

One of the additives of the invention has a formulation comprising about 5%-35% by weight distyrenated phenol, about 0%-5% by weight monostyrenated phenol and about 50%-75% by weight of tristyrenated phenol.

Another additive of the invention has a formulation comprising about 40%-50% by weight distyrenated phenol, about 10%-20% by weight monostyrenated phenol and about 30%-40% by weight of tristyrenated phenol.

The preferred additive have the formulations set forth in Tables 1 and 2.

TABLE 1

| Analysis Description | Minimum | Maximum | Unit measure | Results |
| --- | --- | --- | --- | --- |
| % Di Substituted Phenol | 18 | 29.0 | % | 28.2 |
| % Mono Substituted Phenol | 0.0 | 3.0 | % | 1.4 |
| % Phenol | 0.0 | 0.50 | % | 0 |
| % Styrene | 0.0 | 0.50 | % | 0.25 |
| % Tri Substituted Phenol | 63.0 | 73.0 | % | 70.1 |
| % Water | 0.0 | 0.50 | % | 0.03 |
| Acid Value | 0.0 | 2.0 | # | 0.8 |
| Gardner Color | 0 | 5 | # | 2 |
| Viscosity @ 25 c | | | Cps | 43991 |

TABLE 2

| Analysis Description | Minimum | Maximum | Unit measure | Results |
| --- | --- | --- | --- | --- |
| % Di Substituted Phenol | 44.0 | 48.0 | % | 45.59 |
| % Mono Substituted Phenol | 12.0 | 18.0 | % | 14.44 |
| % Phenol | 0.0 | 1.0 | % | 0.91 |
| % Tri Substituted Phenol | 34.0 | 42.0 | % | 38.53 |
| % Water | 0.0 | 0.50 | % | 0.04 |
| Acid Value | 0.0 | 2.0 | # | 0.19 |
| Gardner Color | 0 | 3.0 | # | 1 |
| Viscosity @ 25 c | 2500.0 | 5000.0 | Cps | 4821 |

The additives and the resins compositions of the invention are particularly useful for the following uses: potting compounds, glues, one and two part epoxy cements and putties, solvent borne and water borne coatings, bridge deck overlays, wind blades in wind mill turbines, interior and exterior wall, ceiling, floor, roof coatings, electronic applications, adhesives and sealants, powder coatings, concrete coating and repair materials, self-leveling waterborne and solvent born flooring applications, wall coatings, joint fillers, sealants, grout coats, use to coat concrete, metal, wood, composites, pre-coated products, asphalt, polymeric materials. They are also useful in one and two part latex coatings having longer pot life, shorter cure time or walk on time, broader overcoat window, flexibility, mandrel bend, impact resistance, toughening, adhesion, corrosion resistance, flash rust inhibition, higher gloss, smoothness and clarity, uv/condensation resistance, wetting ability, edge retentive properties.

The additives and compositions of the invention are also useful in improving corrosion resistance which allows for the reduction or elimination of metals (such as zinc, zirconium, chromium, and others), utility in pigment dispersion and allows direct anticorrosive and other pigments to be dispersed, useful in $TiO_2$ slurries, useful in organic opacifiers, due to antioxidant properties of the product (hindered phenol), conversion coatings can be produced which convert $Fe_2O_3$ to $Fe_3O_4$, conversions coatings and coatings with improved adhesion can be used to produce surface tolerant coatings these are used over marginally prepared surfaces (surfaces contains old paint and rust) and still provide adequate protection.

Other benefits of the invention include: addition of the product directly to an unmodified amine allows for properties similar to a modified amine (ie adduct formation and modification with dimer fatty acids among other useful amine modifications) the product can be used to replace some or all of the expensive modified amines without detriment effects to most or all of the final product and coating properties.

It also improves "poor" solvents (ie xylene) by adding polarity to the solvent. This affect increases solvent power and can improve film formation improving properties Further benefits include improved properties with support resins (carboxylated low mw styrene polymers and derivatives (also called support resin latexes) used in coatings and printing inks) Other benefits include traffic marking paints and coatings, dispersing aid for water based and solvent passed waxes used in coatings, blend with other plasticizers, blend with nano particles, use as anti microbial in wet latex and dry latex films. also as an in-can preservative, use in free radical polymerization of resins as short stop, use to eliminate oxidizing components in free radical reactions such as latexes. this improves microbial efficiencies, mixtures with antimicrobials to improve efficiency in oxidizing conditions—oxidizer scavengers.

Dilutions in solvents or dispersions of DSP, TSP or other hindered phenol or in combination in water from 0.001% to 99.9% for application to a variety of end uses such as wood treatment including anti-microbial on wood—ie antimicrobial surface treatment (and in coatings) for water splash and water immersion), substrates—wood, concrete, metal, fiberglass, useful in composites, cationic epoxies and cationic acrylics, printing inks, colorant dispersions, graphic arts, bookbinding, coatings, footwear and leather assembly, graphic arts, hot melt adhesives, laminating, common household stain resistance in latex and other coatings, improving intercoat adhesion of epoxies and related chemistries, low temperature cure of epoxies, remediation or retardation of reaction rate for "faster" amines, adhesion promoter on plastics metals, wood, concrete, asphaltics etc, improving asphaltic emulsions, roof coatings, over cementitious fiberboard, flooring applications, traffic paints, sound dampening, carbon fiber composites, hot melt adhesives, organic and inorganic colorants, asphalt additive and primer—recoat—topcoat, cement and concrete coatings, clears and pigmented coatings, used as emulsifying and dispersing agents and for additives in waxes and polishes, provides a low voc (volatile organic content) biocide for the protection of industrial water-based products against harmful bacteria, yeasts and fungi, provide reliable and effective antimicrobial protection in a wide range of water-based products and formulations, plasticizer, flow and leveling agent, barrier coatings, house wrap, low viscosity toughening agent designed for use in epoxy systems, effective in both decorative and functional coatings, epoxy anti blush agent—reduces amine blush/bloom, pigment and powder dispersants, binders for low voc, low odor interior and exterior paints, acrylic and other latexes, emulsions or dispersion for masonry paints and primers, texture coatings, elastomeric coatings, masonry paints and primers, caulks and sealants, pipeline coatings, marine antifouling agents, adhesives—1 and 2 part systems, latex paints, coated over substrates such as steel, cold rolled steel, galvanized steel, aluminum, concrete, wood, asphalt, plastic, rubber, previously painted surfaces and tiles.

Preferred application of the invention includes:

1. Pigment Dispersion

Efficient and effective pigment dispersion is necessary in order to obtain optimum tint or hiding strength with good gloss and anticorrosive properties in coating. High quality coatings are characterized by a perfect pigment dispersion, optimal pigment particle size and long-term stabilization of the dispersed particle in the formulation.

The dispersion process consists of the permanent breaking down of agglomerates into, as far as possible, primary particles by the shear forces of the equipment being employed. A mixture of crushing action and mechanical shearing force is necessary. Wetting out occurs at the surface of a pigment when a binder (or surface active agent) sticks to the pigment's surface and acts as a connection between the pigment and the binder. The air and moisture are displaced from the surface. Between the particles of the pigment aggregates, agglomerates are replaced by the resin solution. A lower viscosity tends to lead to a more even pigment distribution. Stabilization prevents the pigments from re-agglomerating. The pigment dispersion is stabilized by dispersing agents in order to prevent the formation of uncontrolled flocculates. The resultant suspension is stabilized due to the adsorption of binder species or molecules at the pigment surface. It has been found that pigments dispersed in the presence of the invention are readily dispersed, reducing extended need for grinding the pigments.

2. Anti Corrosive or Corrosion Resistant Coatings Over Metals Such as Cold Rolled Steel, Aluminum Alloys.

Corrosion resistant coatings protect metal components against degradation due to moisture, salt spray, oxidation or exposure to a variety of environmental or industrial chemicals. Anti-corrosion coating allows for added protection of metal surfaces and act as a barrier to inhibit the contact between chemical compounds or corrosive materials. These products are enhanced by improving adhesion, flexibility and impact resistance through the use of TSP greatly improving the life of the coating.

3. Conversions Coatings Over Metal

A conversion coating is a protective surface layer on a metal that is created by chemical reaction between the metal and a chemical solution. The industry offers some options in conversion coatings and chemical coatings for metal treatment processes. TSP offers an alternative to heavy metal based conversion coating as well as salt based conversions coatings by providing an organic additive that also protects the metal in the long term.

4. Overcoat Window and Intercoat Adhesion

Growth in the global coating's market and economies coupled with ongoing VOC requirements continue to bring challenges in high performance protective coatings.

Conventional high solid polyamide technology for two pack epoxies, provides outstanding performance and has become the industry standard for application in this sector. However, a major limitation to date is their limited re-coat window after applying the initial coating; this window or the time within which a second coating can be applied to result in good adhesion, has become of mounting importance. Increased geographical separation of the coating and fabrication processes has resulted in a requirement for protective primers with 3 to 6 months re-coat window. Conventional high solids epoxies have only a limited re-coatability, leading to higher cost for surface pre-treatment and extended down times, prior to application of subsequent coats. The innovative TSP technology presented here offers significantly increased performance to negate this issue, delivering higher performance value to both the formulator and end applicator.

5. Pipeline Coatings—Powder Coatings

The key to a successful pipeline or rebar anti-corrosion program is the coating system. The successful coating system comprises proven high-quality coating materials and consistent, reliable application of the coating materials. Fusion-bonded epoxy (FBE) has been used in these markets for many years.

A fusion-bonded epoxy is a one part, heat curable, thermosetting epoxy resin powder that utilizes heat to melt and adhere to a metal substrate. It provides a coating with excellent adhesion, a tough, smooth finish resistant to abrasion and chemicals and does not entrap solvents. Improvements in final coatings properties are always needed. It is expected that corrosion and impact resistance and cathodic disbondment properties will be improved with TSP.

6. Marine Antifouling and Foul Release Coatings

The fouling of marine vessels is a significant Navy problem. Marine fouling can increase fuel consumption by as much as 20%. Historically, marine antifouling paints have used compounds toxic to marine organisms as a means of combating fouling. The environmental impact of these toxic coatings has come under increased scrutiny. There is increasing concern about the toxic exposure to shipyard workers and the disposal of hazardous waste from antifouling paints removed during ship maintenance and repainting. Also, industrial and municipal facilities have incurred costs due to the clogging of water intake systems. Traditional methods for controlling biofouling of water intakes depend on the use of targeted chlorination. Due to the smooth surfaces obtained when using TSP and potentially other properties, TSP ie expected to perform well as a marine antifouling and/or foul release coating.

7. Cationic Coatings

As the base resin in cationic electrodeposition coating compositions, those routinely used as base resins for cationic electrodeposition coating compositions are, for example, resins having in their molecules cationizable groups such as amino, ammonium salt, sulfonium salt, phosphonium salt and the like (which are hereafter referred to as "cationic resin") can be named. As useful resin species, any of epoxy resin, acrylic reins, polybutadiene resin, alkyd resin, and polyester resin is suitable. In particular, amine-added epoxy resin which is obtained through addition reaction of amino-containing compound with polyepoxide compound is advantageous.

8. Traffic Marking Paints Over Asphalt and Concrete

Traffic marking paints are designed to provide maximum performance and contain a fast drying binder Key features include; low VOC content, outstanding glass bead retention, superior early wash-out resistance, and consistent drying times even under high humidity conditions. These are used primarily for long line striping on streets and highways and parking lot striping. Other possible uses include auxiliary markings such as stop bars and crosswalks, and for striping airfields. Improved adhesion is always needed. TSP is expected to provide improved properties in this area.

9. Composites Such as Wind Blades in Wind Mill Turbines, Potting Compounds, Electronic Applications Epoxy-based composites have environmental, production, and cost advantages over other resin systems. Epoxies also allow shorter cure cycles, increased durability, and improved surface finish Prepreg operations further reduce processing time over wet lay-up systems. In turbine blade manufacture for instance, infusion techniques are becoming more prevalent; the traditional resin transfer moulding injection time is too long as compared to the resin set-up time, limiting laminate thickness. Injection forces resin through a thicker ply stack, thus depositing the resin where in the laminate structure before gelatin occurs. Specialized epoxy resins have been developed to customize lifetimes and viscosity. TSP is expected to help with viscosity reduction, flexibility and wetting of reinforcing fibers.

In electronics, potting is a process of filling a complete electronic assembly with a solid or gelatinous compound for resistance to shock and vibration, and for exclusion of moisture and corrosive agents. Thermo-setting plastics such as epoxies are often used. TSP would add impact resistance.

Most circuit board assembly houses coat assemblies with a layer of transparent conformal coating rather than potting. Conformal coating gives most of the benefits of potting, and is lighter and easier to inspect, test, and repair. Epoxies are used here as well. TSP would add flexibility.

10. Adhesives, Sealants, Grouts, and Joint Fillers

Typical competitive options for adhesives, sealants, grouts and joint fillers are often based on epoxy, urethane, and latex polymers. Epoxy adhesives and sealants will bond to a variety of substrates. They can cure at either room temperature or be accelerated with higher temperatures. Urethane adhesives and sealants will also bond to a variety of substrates and offer a wide range of flexibility when cured. While their resistance to chemicals, fuels and oils is excellent, they provide only average bond strength to metal without the use of a primer. TSP can be used to improve adhesion in epoxies, polyurethanes and latexes.

11. Concrete Coatings, Self Leveling Flooring and Bridge Deck Overlays

There are many benefits to using concrete coatings, self leveling flooring and bridge deck overlays. These include aesthetics, and protection from wear and tear. The concrete is protected but equally important is the protection of the reinforcing metal from corrosion. TSP is expected to improve impact resistance and corrosion protection to these materials. TSP also improves gloss and reduces the tendency of the coating to crack as the concrete shifts, maintaining the coatings integrity.

12. Asphaltic Emulsions

Asphalt emulsions are brushed or sprayed on asphalt pavement to improve appearance and seal out moisture and oxygen, which can degrade the underlying asphalt. Typically lasting two to four years, sealcoats can extend the life of the pavement, while maintaining a uniform black appearance on paved surfaces. It is expected that TSP would improve the adhesion of asphalt emulsions to the substrate.

13. Intumescent Coatings

Intumescent coatings are manufactured from epoxy or other polymeric materials and are inert at low temperatures. They swell (or intumesce) to provide a charred layer of low conductivity foam when exposed to high temperatures. This char layer reduces the rate of temperature rise in the steel and prolongs the steels load bearing capacity. Improvements in ascetics and char formation are needed. TSP is expected to improve these properties due to its ability to improve gloss and its ability to contribute to char formation.

In an other embodiment of the invention, ethoxylated styrenated phenols (specifically TSP POE 40) are used to achieve the same results as above. The TSP POE 40 mechanism is quite different, as it appears we do not have discrete phases due to the clarity of our epoxy materials.

The benefits with TSP POE 40 are: excellent impact strength, combines improved flexibility with high hardness, provides good chemical and moisture resistance, easy to handle and formulate, water white formulation capability, fast cure. Many impact modifiers need epoxy functionality. However the product of the invention does not. This reduces formulation complexity since epoxy amine rations remain the same. Different levels take the final product from rigid to very flexible all the while maintaining a good level of surface hardness.

EXAMPLE I

Manufacture of Additive

POE 40 TSP was manufactured by methods known in the art. One equivalent of tristyrenated phenol was added to an autoclave, a catalytic amount of KOH was added, and the mixture was heated and the water removed. 40 equivalents of ethylene oxide were added and allowed to react to completion. A small amount of acid was added to neutralize the KOH catalyst and the product vacuum stripped to remove trace amounts of unreacted EO.

EXAMPLE IA

Using the procedure of Example I above, POE 10, POE 20, POE 30 TSP adducts were synthesized.

EXAMPLE II

Hardener Adduct Preparation

A 4:1 BAC (1,3 bis-(aminomethyl)cyclohexane) epoxy adduct was made by adding 400 grams of BAC to a large glass jar. Next, 100 grams of EPON 828 epoxy resin was added to the jar. A stainless steel two blade stirrer was added to the jar and topped with a lid with a hole that allowed the stirrer shaft to protrude through and rotate freely. The adduct was allowed to stir and react for 8 hours at RT.

EXAMPLE III

Epoxy Hardener Mixtures

Using the epoxy equivalent weight of the epoxy dispersion and the active hydrogen equivalent weight of the hardener, the appropriate amounts of the epoxy dispersion and hardener are added at a 1:1 equivalence ratio along with the desired amount of POE 40 TSP additive to a small paint can (¼ pint) and mixed with a stainless steel three blade mixer for approximately one minute, then immediately poured out onto a hard surface and allowed to cure at ambient temperatures. No pigment was added.

A different mixture was made for each level of POE 40 TSP additive along with some control samples with no additive or with the Croda commercial impact modifier additive. The cured resin was cut into dogbone-shaped pieces for testing of clarity, tensile strength, flexibility, and impact strength.

The cured dogbones containing the POE 40 TSP additive were clear indicating no phase separation. As the amount of additive increased, the flexibility of the dogbone increased and the pieces became rubbery rather than rigid and brittle like the unadditized dogbones.

Observation of the additized epoxy resin showed that the product had excellent impact strength, improved flexibility with high hardness, good chemical and moisture resistance, easy to handle and formulate, water white formulation capability and fast cure.

Many impact modifiers need epoxy functionality. However the product of the invention does not. This reduces formulation complexity since epoxy amine ratios remain the same. Different levels take the final product from rigid to very flexible while maintaining a good level of surface hardness.

EXAMPLE IV

A bisphenol A-based liquid epoxy resin from Hexion/Momentive, EPON 828, viscosity 15,300 cps, was used for the epoxy. The additives used in this study are listed in the table 3 below. Note that NP indicates nonyl phenol.

TABLE 3

| Additive | Hydrophobe | Moles of EO | Percent solids |
|---|---|---|---|
| Benzyl alcohol | — | — | — |
| DSP | DSP | 0 | 100 |
| DSP 5 | DSP | 5 | 100 |
| TSP 15/7 | DSP | 15.7 | 100 |
| TSP | TSP | 0 | 100 |
| TSP 5 | TSP | 5 | 100 |

TABLE 3-continued

| Additive | Hydrophobe | Moles of EO | Percent solids |
|---|---|---|---|
| TSP 10 | TSP | 10 | 100 |
| NP | NP | 0 | 100 |
| NP4 | NP | 4 | 100 |

The liquid epoxy resin was added to a small paint can followed by the appropriate amount of additive. The mixture was mixed without entraining air with a stainless steel three blade mixer for approximately 15-20 minutes. All reagents were stored and mixed at constant temperature (23° C.).

Viscosities of epoxy and additive mixtures were determined using a Brookfield RV viscometer, spindle #6, 4 RPM. All viscosities were determined at constant temperature (23° C.).

EXAMPLE V

Hardener Adduct Preparation for Cure Time Data

A 4:1 XTA adduct (XTA from Hexion—60-100% 1,3 bis-(aminomethyl)cyclohexane, 13-30% imino-bes(4 aminomethyl-4'-cyclohexylmethyl)amine, and 1-3% 3-azabicyclo[3.2.2]nonane was made by adding 400 grams of XTA to a large glass jar. Next, 100 grams of epoxy was added to the jar. A stainless steel two blade stirrer was added to the jar and topped with a lid with a hole that allowed the stirrer shaft to protrude through and rotate freely. The adduct was allowed to stir and react for 8 hours at RT. The final calculated AHEW was 48.6.

EXAMPLE VI

Epoxy Hardener Mixtures

Using the epoxy equivalent weight of the epoxy dispersion and the active hydrogen equivalent weight of the hardener, the appropriate amounts of the epoxy dispersion and hardener are added at a 1:1 equivalents ratio to a small paint can (¼ pint) and mixed with a stainless steel three blade mixer for approximately one minute and then immediately used to determine cure time. This is shown in table 4 below.

TABLE 4

| Additive percent | Additive amount | Epoxy (grams) | XTA adduct (grams) |
|---|---|---|---|
| 0 | 0 | 100 | 25.9 |
| 9 | 9 | 91 | 23.5 |
| 23 | 23 | 77 | 19.9 |

EXAMPLE VII

Pot Life Determination

To determine pot life, the mixture of epoxy, additive and hardener was immediately subjected to an RV Brookfield Digital Viscometer. A number 6 spindle is used set at 4 RPM to minimize any shear thinning effects. The initial viscosity is recorded and then subsequently every 5 minutes along with the temperature of the mixture obtained by a thermocouple inserted into the mixed system. The pot life is defined as the time required for the initial viscosity to double.

Cure Time Determination

Cure times were determined using a BYK dry time recorder. 1:1 equivalent epoxy hardener mixtures were drawn down on acrylic plastic slides using a 150 micron (~5 mil) draw down cube. The recorder was set for 24 hours and the samples were evaluated in duplicate. A needle slides across the slide over the 24 hour period. This creates the characteristic data shown in FIG. 1 which characterizes the different stages of the cure time from the dry time recorder.

The description of the different phases (phases 1-5-circled numbers) as shown in FIG. 1 area as follows:

(1) During the early stages of drying, the coating tends to flow back into the wake of the stylus. Solvent is evaporating.

(2) When the tendency of the flow has ceased, the film may be considered set. The epoxy amine reaction takes place at this time which also increases Mw to build viscosity. A thumb print will show on the surface, but no epoxy will come off on your thumb.

(3) As the drying process continues, a skin will form. Visually, this part of the film formation is seen when the stylus begins to tear the surface of the film. The film may be considered surface dry or dust free when the skin is no longer ruptured by the stylus.

calculated. Higher ratios are better allowing for longer application time. It is obvious that most additives reduce the viscosity of the epoxy as well as improved the pot life to cure time ratio to some extent over the benzyl alcohol control. Note also the DSP improves clarity and is much better than the current benzyl alcohol solvent.

The viscosity, pot life and cure time data are presented in the following table. Each additive was added to the epoxy at 9 and 23%. The epoxy solution viscosity was measured as was the epoxy solution with amine hardener. Pot life and cure time for each mixture was measured and the pot life to cure time ratio calculated. Higher ratios are better allowing for longer application time. It is obvious that most additives reduce the viscosity of the epoxy as well as improved the pot life to cure time ratio to some extent over the benzyl alcohol control. Note also the DSP improves clarity and is much better than the current benzyl alcohol solvent.

Table 5 below shows the impact of additives on viscosity, pot life, cure time and film clarity.

TABLE 5

| | Additive | % | Epoxy Mixture Visc. (Cps) | Epoxy amine mixture - Initial Visc. (Cps) | Pot life (hrs) | Cure time (hrs) | Pot life:cure time ratio | Film clarity |
|---|---|---|---|---|---|---|---|---|
| 1 | None | 0 | 12,000 | 2,500 | 0.61 | 3.3 | 0.18 | hazy |
| 2 | BA | 9 | 2,500 | 2,500 | 0.28 | 3.4 | 0.08 | hazy |
| 3 | BA | 23 | 1,500 | 1,000 | 0.12 | 2.55 | 0.05 | hazy |
| 4 | DSP | 9 | 20,000 | 5,500 | 0.36 | 2.5 | 0.14 | slightly hazy |
| 5 | DSP | 23 | 32,000 | 8,000 | 0.20 | 2.55 | 0.08 | clear |
| 6 | DSP5 | 9 | 13,000 | 4,000 | 0.71 | 5.1 | 0.14 | hazy |
| 7 | DSP5 | 23 | 9,000 | 4,500 | 1.04 | 6.85 | 0.15 | slightly hazy |
| 10 | DSP15.7 | 9 | 10,000 | 3,500 | 0.76 | 7.25 | 0.10 | hazy |
| 11 | DSP15.7 | 23 | 5,500 | 2,500 | 1.22 | 9.5 | 0.13 | hazy |
| 12 | TSP | 9 | 32,000 | 8,000 | 0.54 | 3 | 0.18 | slightly hazy |
| 13 | TSP | 23 | 48,000 | 13,000 | 0.37 | 2.75 | 0.13 | slightly hazy |
| 14 | NP | 9 | 9,500 | 2,300 | 0.23 | 2 | 0.11 | hazy |
| 15 | NP | 23 | 6,000 | 4,000 | 0.07 | 1.7 | 0.04 | clear |
| 16 | NP4 | 9 | 7,500 | 3,500 | 0.72 | 5.5 | 0.13 | hazy |
| 17 | NP4 | 23 | 3,500 | 3,000 | 0.99 | 7.25 | 0.14 | slightly hazy |

(4) There is a surface trace from the stylus contact.

(5) It is considered through dry when the stylus rides above the film.

The description of end Points 1 to 5 (Numbers at bottom of FIG. 1)

End of 2—Set to touch (also described as tack free or thin film set)

End of 4—Surface dry (also called dust free or cotton free)

End of 5—Through dry

The data recorded is the final cure of the epoxy film (point 5—Through dry).

EXAMPLE VIII

Results for Viscosity Reduction and Pot Life/Cure Time Modification

The epoxy solution viscosity was measured as was the epoxy solution with amine hardener. Pot life and cure time for each mixture was measured and the pot life to cure time ratio Waterborne Epoxies Another embodiment of the invention relates to waterborne epoxies. The prior art is silent on the use of Distyryl phenol, tristyryl phenol or cumylphenol based surfactants for use in the manufacture of waterborne epoxies. Surprisingly the above surfactants improved the stability of the dispersion, including freeze-thaw resistance. Additionally, these distyryl phenol, tristyryl phenol or cumylphenol based surfactants have been found to provide excellent stability at room temperature and elevated storage temperature.

While not wishing to be bound by conjecture, the following hypothesis is suggested for the exemplary properties imparted by the distyryl phenol, tristyryl phenol or cumylphenol hydrophobes.

Upon examination of their structures (Structures 2, 3 and 4 above) it is readily apparent that these structures are very similar to that of epoxy resins shown in the structure above (Structure 1). It is hypothesized that the similarity in structure provides for superior adsorption and absorption onto or into the epoxy used in the dispersion by the surfactants produced from these hydrophobe structures. This compatibility is thought to result in greater stability of the dispersion, improving overall properties of the dispersion and subsequent coating properties.

Examples of Improved Waterborne Epoxy Resin Stability

EXAMPLE IX

The epoxy dispersions were created at 75% solids using 0.5% by weight surfactant based on epoxy. Into a 600 mL beaker was added to the appropriate amount of surfactant (Table 6). To this was added 300 g of epoxy (EPON 828—Hexion/Momentive). Subsequently about 100 g of water was added to ensure the solids of the final dispersion was 75% by weight epoxy. Finally, the ingredients were mixed using a dispersator from Premier Mill Corp at 40% power for 3 minutes. The resultant dispersion was transferred to a 16 oz jar and capped.

The various surfactants were chosen to demonstrate the common hydrophobes used in the dispersion of epoxies. These include lauryl, nonyl phenol, and dioctyl maleate hydrophobes. Each surfactant end group was a sulfate. One surfactant also employed ethylene oxide. These were compared to a distyryl phenol based surfactant with ethylene oxide and a sulfate end group.

TABLE 6

| Surfactant | Supplier | Surfactant solids (%) | Surfactant added (g) |
|---|---|---|---|
| Sodium lauryl sulfate | Rhodia | 29.5 | 5.08 |
| Nonylphenol (4 moles EO) Sulfate (NH4) | Cytec | 31 | 4.84 |
| Sodium dioctyl sulfosuccinate | Cytec | 70.5 (in propylene glycol) | 2.13 |
| DSP 20 moles EO Sulfate (NH4) | Ethox | 50 | 3 |

Shelf Stability Results for Example IX

The results of the 75% solids shelf stability test are shown below in Table 7. The nonyl phenol based surfactant showed separation of the epoxy from the rest of the dispersion at the bottom of the flask after 1 month. This was expressed as a semi translucent phase. After two months, both sodium lauryl sulfate and the nonyl phenol based surfactants showed separation. The results for both the sodium dioctyl sulfosuccinate and distyryl phenol based surfactant demonstrate good room temperature stability. Note that the sodium dioctyl sulfosuccinate contains about 30% propylene glycol, which is undesirable since it contributes to VOCs and therefore is undesirable.

TABLE 7

| Surfactant | Supplier | 1 month at room temperature | 2 months at room temperature |
|---|---|---|---|
| Sodium lauryl sulfate | Rhodia | one phase | two phases |
| Nonylphenol (4 moles EO) Sulfate (NH4) | Cytec | two phases | two phases |
| Sodium dioctyl sulfosuccinate (in 30% PG) | Cytec | one phase | one phase |
| Sodium dioctyl sulfosuccinate (in 30% PG) | Ethox | one phase | one phase |

EXAMPLE X

The epoxy dispersions were created at 75% solids using 0.5% by weight surfactant based on epoxy. Into a 600 mL beaker was added to the appropriate amount of surfactant (Table 4). To this was added 300 g of epoxy (EPON 828—Hexion/Momentive). Subsequently about 100 g of water was added to ensure the solids of the final dispersion was 75% by weight epoxy. Finally, the ingredients were mixed using a dispersator from Premier Mill Corp at 40% power for 3 minutes. Part of the resultant dispersion was transferred to a 10 ml jar, capped and tested for freeze thaw resistance.

Freeze Thaw Results for Example V

The 10 ml samples from example 2 were place in a −20 C freezer overnight. The next day they were removed and allowed to thaw (Table 8). All samples expect the distyryl phenol based sample from Ethox showed a significant layer of water on the surface indicating phase separation and failure of the freeze/thaw test. The samples that exhibited phase separation also did not flow when the container was tipped on its side indicating coagulation of the dispersion.

TABLE 8

| Surfactant | Supplier | Freeze thaw cycles passed | Flow |
|---|---|---|---|
| Sodium lauryl sulfate | Rhodia | none | none |
| Nonylphenol (4 moles EO) Sulfate (NH4) | Cytec | none | none |
| Sodium dioctyl sulfosuccinate (in 30% PG) | Cytec | none | poor |
| DSP 20 moles EO Sulfate (NH4) | Ethox | at least one | normal |

EXAMPLE XI

The epoxy dispersions were created at 75% solids using 0.5% by weight surfactant based on epoxy. Into a 600 mL beaker was added to the appropriate amount of surfactant (Table 6). To this was added 300 g of epoxy (EPON 828—Hexion/Momentive). Subsequently about 100 g of water was added to ensure the solids of the final dispersion was 75% by weight epoxy. Finally, the ingredients were mixed using a Dispersator from Premier Mill Corp (FIG. 4) at 40% power for 3 minutes. These were then further diluted to 50% solids. To a 100 ml graduated cylinder was added 75 ml of the mixture and capped with polyethylene film. These samples were then put into a 50 C oven for 2 months.

Heat Age Results for Example XI

The results of the 50% solids heat age test at 50° C. are shown below in Table 9. After 2 months the sodium lauryl sulfate and the nonyl phenol based surfactant showed separation. The results for both the sodium dioctyl sulfosuccinate and distyryl phenol based surfactant demonstrate good elevated temperature stability. Note that the sodium dioctyl sulfosuccinate contains about 30% propylene glycol which is undesirable since it contributes to VOC's and therefore is undesirable in epoxy dispersions.

TABLE 9

| Surfactant | Supplier | 2 months at 50 C. |
|---|---|---|
| Sodium lauryl sulfate | Rhodia | two phases |
| Nonylphenol (4 moles EO) Sulfate (NH4) | Cytec | two phases |
| Sodium dioctyl sulfosuccinate (in 30% PG) | Cytec | one phase |
| DSP 20 moles EO Sulfate (NH4) | Ethox | one phase |

EXAMPLE XII

Further experiments were performed on epoxy dispersions for freeze thaw. Dispersions were created at 75% solids using 0.8 by weight solids DSP 20 moles EO Sulfate (NH4) surfactant and 4% of DSP 20 moles EO based on epoxy. Into a 600 mL beaker was added to the appropriate amount of surfactant (Table 10). To this was added 300 g of epoxy (EPON 828—Hexion/Momentive). Subsequently about 100 g of water was added to ensure the solids of the final dispersion was 75% by weight epoxy. Finally, the ingredients were mixed using a dispersator from Premier Mill Corp at 40% power for 3 minutes. Part of the resultant dispersion was transferred to a 50 ml jar, capped and tested for freeze thaw resistance. The dispersion passed 5 freeze thaw cycles.

TABLE 10

| Surfactant | Supplier | Surfactant solids (% in water) | Surfactant added (g) |
|---|---|---|---|
| DSP 20 moles EO | Ethox | 50% | 24 |
| DSP 20 moles EO Sulfate (NH4) | Ethox | 50% | 4.8 |

Production of Improved Epoxy Hardener Mixtures

In a further embodiment of the invention we provide improved epoxy hardener mixtures. The prior art is silent on the use of Distyryl phenol, tristyryl phenol or cumylphenol based surfactants for use in producing epoxy resin hardeners. These distyryl phenol, tristyryl phenol or cumylphenol based surfactants have surprisingly been found to improve both the pot life and cure times of epoxy/hardener systems. Pot life can be increased while cure time is maintained or decreased.

While not wishing to be bound by conjecture, the following hypotheses are suggested for the exemplary properties imparted by the distyryl phenol, tristyryl phenol or cumylphenol containing surfactants. The large, bulky hydrophobes are not expected to be as mobile as alternative hydrophobes, possibly due to their strong affinity to each other due to the benzylic character of the hydrophobes. This reduced mobility results in slower flow of amines from the micelles produced when the surfactant/hardener mixture is dispersed into water. The surfactants may also delay transport of the amine hardener to the dispersed epoxy when mixed, due to the hydrophobes affinity to the amine hardener, especially when amine adducts are used as hardeners.

Finally, another of the problems with state-of-the-art hardeners and waterborne epoxy dispersion mixtures used in coatings, adhesives, damping and other products including epoxy cement concrete coatings, coatings for concrete, primers for metal and other applications is that often the pot life (the usable life of a mixture of an epoxy hardener and an epoxy) is correlated strongly to the cure time (time for the applied material to cure). Thus, if the pot life is very long, so is the cure time. However, a long pot life is desired allowing larger batches to be made, while shorter cure times are desired to allow for earlier use of the finished coated product. It is difficult to simultaneously increase pot life while maintaining or decreasing cure time. Compositions of the invention.

A variety of hardeners or curing agents are available to cure the epoxy compositions of the invention. Curing may be achieved by reacting an epoxy with polyfunctional curatives or hardeners. In principle, any molecule containing a reactive hydrogen may react with the epoxide groups of the epoxy resin. Common classes of hardeners for epoxy resins include aliphatic amines cycloaliphatic amines, aromatic amines, acids, acid anhydrides, dicyandiamide, polysulfides, isocyanates, melamine-formaldehyde, urea-formaldehyde and phenol-formaldehyde.

Relative reactivity (lowest first) is approximately in the order: phenol<anhydride<aromatic amine<cycloaliphatic amine<aliphatic amine<thiol. General classes of amine hardeners are as follows: mannich bases and phenalkylamines, polyetheramines, ethyleneamines and their adducts, polyamides and amidoamines, arylyl diamines, cycloaliphatic amines, and aromatic amines.

The epoxy curing reaction may be accelerated by addition of small quantities of accelerators. Tertiary amines, carboxylic acids and alcohols (especially phenols) are effective accelerators. Bisphenol A is a highly effective and widely used accelerator, but is now increasingly replaced due to health concerns with this substance.

Examples of Improved Pot Life and Cure Times by Adding Sulfated Styrenated Phenol Surfactants to Hardener and Mixing with a Waterborne Epoxy Dispersion.

Materials

A BPA based epoxy resin from Hexion/Momentive, EPON 828, is used for the epoxy dispersion. BAC from Mitsubishi Gas Chemicals is used in making a 4:1 BAC:epoxy adduct. The surfactants used in this study are listed in Table 11 below.

TABLE 11

| surfactant | hydrophobe | Moles of EO | charge | solids | HLB |
|---|---|---|---|---|---|
| Tergitol NP15 | NP | 15 | non-ionic | 100 | 15 |
| Tergitol NP30 | NP | 30 | non-ionic | 100 | 17 |
| Tergitol S20 | secondary alcohol | 20 | non-ionic | 100 | 16 |
| E-Sperse 703 | DSP | 20 | non-ionic | 100 | 14 |
| E-Sperse 1689 | TSP | 10 | non-ionic | 100 | 9.6 |
| Tergitol S40 | secondary alcohol | 40 | non-ionic | 70 | 18 |
| Aerosol OT-70 | dioctyl maleate | — | Sulfate (Na) | 70 | — |
| E-Sperse 704 | DSP | 20 | Sulfate (NH4) | 50 | — |

HLB is hydrophile/lipophile balance. For nonionic surfactants, it is determined by dividing the weight percent of ethylene oxide units in the surfactant by five. Higher numbers mean higher water solubility.

EXAMPLE XIII

Epoxy Dispersion

A master batch of epoxy dispersion was created at 72% solids using 5% by weight E-Sperse 704 based on epoxy. Into a large stainless steel beaker was added to the appropriate amount of surfactant. To this was added epoxy (EPON 828—Hexion/Momentive). Subsequently water was added to ensure the solids of the final dispersion was 72% by weight epoxy. Finally, the ingredients were mixed using a Dispersator from Premier Mill Corp at 40% power for 3 minutes. The resultant dispersion was transferred to a gallon container.

Hardener Adduct Preparation

A 4:1 BAC (1,3 bis-(aminomethyl)cyclohexane) epoxy adduct was made by adding 400 grams of BAC to a large glass jar. Next, 100 grams of epoxy was added to the jar. A stainless steel two blade stirrer was added to the jar and topped with a lid with a hole that allowed the stirrer shaft to protrude through and rotate freely. The adduct was allowed to stir and react for 8 hours at RT.

To the hardeners was added the appropriate surfactant (see Table 12).

Ancamine 401 (a commercial hardener product form Air Products) was also tested. E-Sperse 703 was used to test pot life and cure time. (See table 13 below)

Epoxy Hardener Mixtures

Using the epoxy equivalent weight of the epoxy dispersion and the active hydrogen equivalent weight of the hardener, the appropriate amounts of the epoxy dispersion and hardener are added at a 1:1 equivalents ratio to a small paint can (¼ pint) and mixed with a stainless steel three blade mixer for approximately one minute and then immediately used to determine cure time.

Pot Life Determination

To determine pot life, a mixed 2K system is immediately subjected to an RV Brookfield Digital Viscometer. A number 6 spindle is used set at 4 RPM to minimize any shear thinning effects. The initial viscosity is recorded and then subsequently every 5 minutes along with the temperature of the mixture obtained by a thermocouple inserted into the mixed system. The pot life is defined as the time required for the initial viscosity to double.

Cure Time Determination

Cure times were determined using a BYK dry time recorder as described earlier.

Results and Discussion

Table 10 shows the components of the individual hardeners prepared and tested for cure time in waterborne epoxy dispersions. Unshaded indicates a neat water dispersible hardener while shading indicates a water borne hardener. Waterborne indicates the presence of water in the hardener while water dispersible indicates no water present initially however it is dispersible after the fact into water.

Note in Table 10 that in the epoxy dispersion, the amount of surfactant (E-Sperse 704) is 5% based on weight solids of epoxy. When the hardener is added, the amount of surfactant based on epoxy in the mixture becomes 17.9% based on weight solids of epoxy. Surfactant in the overall is mixture is approximately 12-14%.

Pot Life and Cure Time Data

Table 13 shows the results of cure time testing for the different hardeners. For comparison, through dry time has been set at 24 hours for films that did not cure after 24 hours. A long pot life and short cure time are desirable. As can be seen, E-Sperse 704 has the best combination of properties.

TABLE 13

Cure Time and Pot Life Data

| surfactant | Pot life (hrs) | Through Dry (hrs) | Pot life to Cure Time Ratio |
|---|---|---|---|
| Tergitol NP15 | 0.08 | 6 | 0.013 |
| Tergitol S20 | 0.17 | 8.5 | 0.020 |
| E-Sperse 703 | 0.18 | 24 | 0.008 |
| Tergitol NP30 | 0.18 | 7.1 | 0.025 |
| E-Sperse 1689 | 0.18 | 5.8 | 0.031 |
| Tergitol NP15 (50%) | 0.28 | 10.8 | 0.026 |
| Tergitol S20 (50%) | 0.27 | >24 | 0.011 |
| E-Sperse 703 (50%) | 0.47 | >24 | 0.020 |
| Tergitol S40 (70%) | 0.25 | >24 | 0.010 |
| Aerosol OT-70 (70%) | 0.28 | 4.5 | 0.062 |
| E-Sperse 704 (50%) | 0.47 | 5.8 | 0.081 |

Table 13 shows the pot life data compared to the through dry time reported in this report. It is clear that E-Sperse 704 offers the best combination of long pot life and fast cure time by the highest ratio of pot life to cure time.

Ancamine 401 was also tested with and without E-Sperse 703 surfactant to determine pot life and cure time effects of added E-Sperse 703 on a commercial product. Note in Table 12 that in the epoxy dispersion, is a 72% epoxy and the surfactant (E-Sperse 704) is 5% based on weight solids of epoxy. The E-Sperse 703 was 42% of the total E-Sperse 703 and Ancamine 401 mixture. In this case the pot life was greatly extended. Note also the viscosity reduction of Ancamine 403 and the epoxy mixture.

TABLE 12

Hardener Compositions

| surfactant | 4:1 BAC (g) | Solids | Surfactant added (g) | AHEW | Viscosity (cps) | phr | Overall % surfactant on epoxy | % surfactant in hardener |
|---|---|---|---|---|---|---|---|---|
| Tergitol NP15 | 25 | 100 | 18.8 | 75.7 | 500 | 30.2 | 12.9 | 42.9 |
| Tergitol S20 | 25 | 100 | 18.8 | 75.7 | 750 | 30.2 | 12.9 | 42.9 |
| E-Sperse 703 | 25 | 100 | 18.8 | 75.7 | wax | 30.2 | 12.9 | 42.9 |
| Tergitol NP30 | 25 | 100 | 18.8 | 75.7 | wax | 30.2 | 12.9 | 42.9 |
| E-Sperse 1689 | 25 | 100 | 18.8 | 75.7 | 500 | 30.2 | 12.9 | 42.9 |
| Tergitol NP15 | 25 | 50 | 37.5 | 108.1 | 250 | 43.1 | 12.9 | 30.0 |
| Tergitol S20 | 25 | 50 | 37.5 | 108.1 | 250 | 43.1 | 12.9 | 30.0 |
| E-Sperse 703 | 25 | 50 | 37.5 | 108.1 | 250 | 43.1 | 12.9 | 30.0 |
| Tergitol S40 | 25 | 70 | 26.8 | 89.6 | 500 | 35.7 | 12.9 | 36.2 |
| Aerosol OT-70 | 25 | 70 | 26.8 | 89.6 | 3750 | 35.7 | 12.9 | 36.2 |
| E-Sperse 704 | 25 | 50 | 37.5 | 108.1 | 250 | 43.1 | 12.9 | 30.0 |

AHEW is adduct hardener equivalent weight; phr is pounds per hundred rate

TABLE 14

Pot life/cure time data

| Surfactant used | E-Sperse 703 | None |
|---|---|---|
| Hardener | Ancamine 401 | Ancamine 401 |
| AHEW of surfactant hardener mixture | 350 | 200 |
| PHR Ancamine 401 added based on epoxy dispersion | 139.6 | 79.8 |
| Initial viscosity cps | 3000 | 18500 |
| Time for viscosity doubling - Pot life (minutes) | 35 | 20 |
| Cure time - hours | 3 | 2 |

It should be noted that while this specific composition was used for the following examples, this does not limit the types of adducts or other hardeners that can be employed for this invention.

Epoxy Reaction Mixtures:

A series of three mixtures were produced (Table 14). The level of TSP was varied (along with the level of solvent. Where applicable, the TSP was added to the liquid epoxy resin (EPON 828 from Momentive) see tables below. The solvent was then added and stirred for three minutes. Finally the hardener was added and stirred for an additional 3 minutes.

Solvents used were as follows: Benzyl alcohol (BA), Xylene and Methyl Ethyl Ketone (MEK).

TABLE 14

Mixtures for testing

| Hardener type | AHEW | Epoxy type | EEW | Hardener to epoxy ratio (AHEW*/EEW**) | TSP % | Solvent % | Amount Epoxy (g) | Amount Hardener (g) | Sample size (g) |
|---|---|---|---|---|---|---|---|---|---|
| 4:1 XTA 801 | 48.6 | 828 | 188 | 0.8 | 0 | 0 | 82.9 | 17.1 | 100.0 |
| 4:1 XTA 801 | 48.6 | 828 | 188 | 0.8 | 15 | 0 | 70.4 | 14.6 | 100.0 |
| 4:1 XTA 801 | 48.6 | 828 | 188 | 0.8 | 30 | 0 | 58.0 | 12.0 | 100.0 |
| 4:1 XTA 801 | 48.6 | 828 | 188 | 0.8 | 0 | 5 | 78.7 | 16.3 | 100.0 |
| 4:1 XTA 801 | 48.6 | 828 | 188 | 0.8 | 15 | 5 | 66.3 | 13.7 | 100.0 |
| 4:1 XTA 801 | 48.6 | 828 | 188 | 0.8 | 30 | 5 | 53.9 | 11.1 | 100.0 |
| 4:1 XTA 801 | 48.6 | 828 | 188 | 0.8 | 0 | 10 | 74.6 | 15.4 | 100.0 |
| 4:1 XTA 801 | 48.6 | 828 | 188 | 0.8 | 15 | 10 | 62.2 | 12.9 | 100.0 |
| 4:1 XTA 801 | 48.6 | 828 | 188 | 0.8 | 30 | 10 | 49.7 | 10.3 | 100.0 |

*Amine Hydrogen Equivalent Weight
**epoxide equivalent weight

EXAMPLE XIV

Solvent Borne Epoxy Mixtures:

Amine adducts are used to cure epoxy resins. Amine adducts are comprised of amines reacted with an amount of epoxy needed to improve compatibility between the amine and the epoxy. The amine adduct used in the following examples was composed of a mixture of 4 parts by weight of an amine (XTA 801—Huntsman) and 1 part epoxy (EPON 828—Huntsman).

A 4:1 XTA 801 epoxy adduct was made by adding 600 g of XTA to a large glass jar, followed by 150 g of epoxy. A stainless steel two blade stirrer was added to the jar and topped with a lid with a hole that allowed the stirrer shaft to protrude through and rotate freely. The adduct was stirred for 8 hours at room temperature.

Pot Life Determination

To determine pot life, the system 2K system is mixed for 3 minutes. The initial viscosity and temperature is recorded and then subsequently every 2 to 5 minutes. The pot life is defined as the time required for the temperature to reach 70° C. (in some cases the pot life did not rise to 70 C). The viscosity was measured using an RV Brookfield Digital Viscometer. A #7 spindle is used, set at 4 RPM to minimize any shear thinning effects. A digital thermocouple was used to measure the temperature.

The data is shown in Table 15-18 below indicates that the pot life for the 0% TSP and the 15% TSP are similar. The pot life for the 30% TSP sample is considerably longer. A longer pot life allows the applicator more time to apply the coating. Most of the other systems at least do not significantly shorten Potlife as a function of increasing TSP.

TABLE 15

Pot Life

| Time | 5% BA 0% TSP Temperature (degrees C.) | 0% TSP Viscosity (cps) | 15% TSP Temperature (degrees C.) | 15% TSP Viscosity (cps) | 30% TSP Temperature (degrees C.) | 30% TSP Viscosity (cps) |
|---|---|---|---|---|---|---|
| 0  | 24.6  | 3500  | 26.6 | 5000  | 29.1 | 6750 |
| 5  | 30.0  | 3250  | 33.5 | 4500  | 35.1 | 5750 |
| 10 | 31.9  | 3500  | 37.8 | 4250  | 40.7 | 4500 |
| 15 | 37.1  | 3000  | 43.6 | 3250  | 46.6 | 3500 |
| 20 | 44.0  | 2250  | 55.0 | 2750  | 50.9 | 3000 |
| 25 | 52.6  | 2000  | 74.0 | 2000  | 54.6 | 3000 |
| 30 | 77.9  | 2000  |      |       | 64.8 | 3250 |
| 32 | 114.3 | 14000 | 97.9 | 15000 | 72.8 | 6250 |
| 33 |       |       |      |       | 78.8 | 13000 |

TABLE 16

Pot Life

| Time | 10% BA 0% TSP Temperature (degrees C.) | 0% TSP Viscosity (cps) | 15% TSP Temperature (degrees C.) | 15% TSP Viscosity (cps) | 30% TSP Temperature (degrees C.) | 30% TSP Viscosity (cps) |
|---|---|---|---|---|---|---|
| 0  | 27.8  | 1160 | 29.3 | 1833 | 28.7 | 3167 |
| 5  | 34.6  | 1167 | 37.7 | 1667 | 35.9 | 2500 |
| 10 | 45.9  | 833  | 47.0 | 1167 | 42.9 | 2000 |
| 15 | 61.9  | 500  | 63.1 | 833  | 50.6 | 1667 |
| 18 |       |      | 96.2 | 2000 |      |      |
| 20 | 104.7 | 1500 |      |      | 56.2 | 1667 |
| 22 |       |      |      |      | 60.7 | 1667 |
| 25 |       |      |      |      | 67.4 | 2000 |
| 28 |       |      |      |      | 75.3 | 3167 |

TABLE 17

| Time | 10% Xylene 0% TSP Temperature (degrees C.) | 0% TSP Viscosity (cps) | 15% TSP Temperature (degrees C.) | 15% TSP Viscosity (cps) | 30% TSP Temperature (degrees C.) | 30% TSP Viscosity (cps) |
|---|---|---|---|---|---|---|
| 0  | 29.0 | 466 | 31.0 | 650  | 29.0 | 1200 |
| 10 | 31.0 | 483 | 32.0 | 666  | 30.0 | 1071 |
| 15 | 32.0 | 583 | 33.0 | 766  |      |      |
| 20 | 32.0 | 633 | 34.0 | 966  | 31.0 | 1267 |
| 25 | 32.0 | 638 | 35.0 | 1250 | 32.0 | 1633 |
| 48 |      |     | 37   | 1887 |      |      |

TABLE 18

| Time | 10% MEK 0% TSP Temperature (degrees C.) | 0% TSP Viscosity (cps) | 15% TSP Temperature (degrees C.) | 15% TSP Viscosity (cps) | 30% TSP Temperature (degrees C.) | 30% TSP Viscosity (cps) |
|---|---|---|---|---|---|---|
| 0  | 26.0 | 416 | 28.0 | 616  | 28.0 | 633 |
| 5  |      |     |      |      |      |     |
| 6  | 28.0 | 433 |      |      |      |     |
| 8  |      |     | 31.0 | 633  | 29.0 | 666 |
| 12 | 30.0 | 466 |      |      |      |     |
| 16 |      |     |      |      | 30.0 | 716 |
| 18 | 31.0 | 516 |      |      |      |     |
| 23 |      |     | 33.0 | 816  |      |     |
| 24 |      |     |      |      | 30.0 | 800 |
| 32 |      |     | 33.0 | 950  |      |     |
| 42 |      |     | 34.0 | 1117 |      |     |

EXAMPLE XV

Cure Time Determination

Cure times were determined using a BYK dry time recorder. The epoxy mixture was drawn down on an Acrylic surface using a 150 micron (~5 mil) draw down cube. The recorder was set for 12 hours and the samples were evaluated in duplicate. A needle slides across the slide over the 12 hour period and creates the characteristic data. Explanation of the different phases is given below.

Cure Time Characterization

Set to touch: When the tendency of the epoxy mixture to flow has ceased, the film may be considered set to touch. A thumb print will show on the surface, but no epoxy will come off on your thumb.

Surface dry: As the drying process continues, a skin will form. Visually, this part of the film formation is seen when the stylus begins to tear the surface of the film. The film may be considered surface dry or dust free when the skin is no longer ruptured by the stylus.

Through dry: It is considered through dry when the stylus rides above the film.

It is apparent based on the data in Table xxx that the cure time is not significantly affected by the addition of any of these levels of TSP. This is important since the cure time can affect productivity if the cure time is increased significantly. Results are summarized in tables 19-22.

TABLE 19

| 5% BA | Cure time | | |
|---|---|---|---|
| | Set to touch | Surface dry | Through dry |
| 0% TSP | 2 | 3.5 | 6.0 |
| 15% TSP | 1.5 | 3.0 | 5.0 |
| 30% TSP | 2.0 | 3.5 | 4.5 |

TABLE 20

| 10% BA | Cure time | | |
|---|---|---|---|
| | Set to touch | Surface dry | Through dry |
| 0% TSP | 3.0 | 3.5 | 4.0 |
| 15% TSP | 2.5 | 3.0 | 3.5 |
| 30% TSP | 3.0 | 3.5 | 4.5 |

TABLE 21

| 10% Xylene | Cure time | | |
|---|---|---|---|
| | Set to touch | Surface dry | Through dry |
| 0% TSP | 4.0 | 6.0 | 12.0 |
| 15% TSP | 4.0 | 6.0 | 7.0 |
| 30% TSP | 4.0 | 5.5 | 8.0 |

TABLE 22

| 10% MEK | Cure time | | |
|---|---|---|---|
| | Set to touch | Surface dry | Through dry |
| 0% TSP | 4.0 | 6.0 | 21.0+ |
| 15% TSP | 3.0 | 5.0 | 6.5 |
| 30% TSP | 3.0 | 5.0 | 6.5 |

EXAMPLE XVI

Gloss

The gloss was measured at 20 degree angle of the epoxy coatings over cold rolled steel as mentioned above. It is apparent that the gloss is considerably enhanced with the addition of TSP. Results are summarized in tables 23-26.

TABLE 23

| Gloss Values | |
|---|---|
| 5% BA | 20° |
| 0% TSP | 71.1 |
| 15% TSP | 111.1 |
| 30% TSP | 113.6 |

TABLE 24

| Gloss Values | |
|---|---|
| 10% BA | 20° |
| 0% TSP | 96.2 |
| 15% TSP | 110.3 |
| 30% TSP | 112.9 |

TABLE 25

| Gloss Values | |
|---|---|
| 10% Xylene | 20° |
| 0% TSP | 91.4 |
| 15% TSP | 114.0 |
| 30% TSP | 114.3 |

TABLE 26

| Gloss Values | |
|---|---|
| 10% MEK | 20° |
| 0% TSP | 80.8 |
| 15% TSP | 106.7 |
| 30% TSP | 98.4 |

EXAMPLE XVII

Conical Mandrel Bend Flexibility

The Conical Mandrel bend test is used to measure flexibility. This test was applied to epoxy coated R-35 panels after 7 days of cure according to ASTM D522-93a. The mandrel bend numbers indicate the equivalent of the diameter of a rod around which the coated panel was bent without cracking or delamination of the coating. Lower numbers indicate higher flexibility.

The results of the mandrel bend test are shown below. Increasing the TSP increased the flexibility dramatically. Results are summarized in Tables 27-30.

TABLE 27

| 5% BA | Mandrel Bend (inches) | |
|---|---|---|
| 0% TSP | 1.0 | fail |
| 15% TSP | 0.0 | pass |
| 30% TSP | 0.0 | pass |

TABLE 28

| 10% BA | Mandrel Bend (inches) | |
|---|---|---|
| 0% TSP | 1.5 | fail |
| 15% TSP | 0 | pass |
| 30% TSP | 0.25 | pass |

TABLE 29

| 10% Xylene | Mandrel Bend (inches) | |
|---|---|---|
| 0% TSP | 1.0 | fail |
| 15% TSP | 0 | pass |
| 30% TSP | 0 | pass |

TABLE 30

| 10% MEK | Mandrel Bend (inches) | |
|---|---|---|
| 0% TSP | 1.0 | fail |
| 15% TSP | 0 | pass |
| 30% TSP | 0 | pass |

EXAMPLE XVIII

Cross Hatch Adhesion Test and Evaluation

The cross hatch adhesion was tested according to ASTM D3359-09. The coating samples were evaluated in duplicate. Adhesion was rated according to the mentioned ASTM method where 5B is no detachment, and 0B is almost complete detachment. The results are show below in table 31. The TSP increased the adhesion of the coating.

TABLE 31

| | Cross Hatch adhesion |
|---|---|
| 10% BA | Cross hatch |
| 0% TSP | 3B |
| 15% TSP | 5B |
| 30% TSP | 4B |

EXAMPLE XIX

Impact Testing

The test panel was placed at the bottom of the impact tube and a weight was dropped from a specific height to determine the inch-pounds of impact failure end point according to ASTM D2794-93. Cracking and delamination are recorded at the point of impact. Both forward (intrusion) and reverse (extrusion) indentations were evaluated. Coating was labeled as brittle coating if cracking or delamination was observed at less than 6 in.-lb. The maximum impact that can be recorded by this method is 160 inch pounds. The samples were evaluated in duplicate. The results are shown below in Table xxx. While the cured epoxy coating samples with no TSP recorded less than 6 inch pounds and are brittle, the samples with 15% and 30% TSP are much less susceptible to cracking and delamination. Results are summarized in Tables 32-35.

TABLE 32

| | Impact Test | |
|---|---|---|
| 5% BA | Intrusion (in. lbs.) | Extrusion (in. lbs.) |
| 0% TSP | 5 | <5 |
| 15% TSP | 5 | <15 |
| 30% TSP | 150 | 160 |

TABLE 33

| | Impact Test | |
|---|---|---|
| 10% BA | Intrusion (in. lbs.) | Extrusion (in. lbs.) |
| 0% TSP | 0 | 0 |
| 15% TSP | 90 | 35 |
| 30% TSP | 160 | 160 |

TABLE 34

| | Impact Test | |
|---|---|---|
| 10% Xylene | Intrusion (in. lbs.) | Extrusion (in. lbs.) |
| 0% TSP | <5 | <5 |
| 15% TSP | 120 | 160 |
| 30% TSP | 160 | 160 |

TABLE 35

| | Impact Test | |
|---|---|---|
| 10% MEK | Intrusion (in. lbs.) | Extrusion (in. lbs.) |
| 0% TSP | <5 | <5 |
| 15% TSP | <5 | <5 |
| 30% TSP | 100 | <5 |

EXAMPLE XX

Corrosion

Standard test panels were made by applying the epoxy mixture to a 0.8×76×127 mm cold rolled steel panel (R35 test panel from Q-Lab). For each mixture, duplicate 5 mil coatings were made on the test panel using a drawdown bar and allowed to cure for 7 days at 23° C. and 50% relative humidity.

Corrosion test panels were made by backing an R35 (0.8× 76×127 mm steel) test panel with white Rustoleum Clean Metal Primer. The primer was allowed to dry for 2 days before the unprimed side of the test panel was coated with the epoxy hardener mixture. For each mixture, duplicate 5 mil coatings were made on the unprimed side of a primed test panel using a drawdown bar and allowed to cure for 7 days. The panels were allowed to dry for 7 days at 23° C. and 50% relative humidity.

The corrosion resistance of was tested after taping edges the coated samples with black Electrical tape to prevent edge penetration of salt water. A single line was scribed on the bottom half of the coated test sample with a razor blade. The samples were placed into the salt fog box with the internal chamber temperature set at 35° C. and the saturator temperature at 47° C. with a spray rate according to ASTM B117-09. The samples were oriented with the test paint facing towards the atomizer and spraying was commenced. Salt spray was continued for 1056 hours (44 days). The results are listed in Tables 2 to xxx. Note that the blister at the scribe is rated from 2 to 8 with the larger numbers indicating larger sizes.

It is apparent from the data below that the frequency of blister, the rust type, surface coverage and scribe delamination all improve with increasing levels of TSP. Results are summarized in Tables 36-40

TABLE 36

| 0% Solvent | Blister at scribe size | Frequency of Blisters | Rust Type | Surface Coverage (%) | Scribe delamination (cm) |
|---|---|---|---|---|---|
| 0% TSP | 4 | medium dense | general | 90 | Complete delamination |
| 15% TSP | 4 | medium | spot | 5 | 1 |
| 30% TSP | none | none | spot | 0.03 | 0.1 |

TABLE 37

| 5% BA | Blister at scribe size | Frequency of Blisters | Rust Type | Surface Coverage (%) | Scribe delamination (%) |
|---|---|---|---|---|---|
| 0% TSP | 4 | medium | general | 20 | 40 |
| 15% TSP | 4 | few | spot | 5 | 10 |
| 30% TSP | 4 | few | spot | <1 | 0 |

TABLE 38

| 10% BA | Blister at scribe size | Frequency of Blisters | Rust Type | Surface Coverage (%) | Scribe delamination (cm) |
|---|---|---|---|---|---|
| 0% TSP | 4 | medium dense | general | 90 | Complete delamination |
| 15% TSP | 4 | medium | spot | 5 | 1 |
| 30% TSP | none | none | spot | 0.03 | 0.1 |

TABLE 39

| 10% Xylene | Blister at scribe size | Frequency of Blisters | Rust Type | Surface Coverage (%) | Scribe delamination (%) |
|---|---|---|---|---|---|
| 0% TSP | 6 | medium | general | 5 | 20 |
| 15% TSP | 6 | Few | spot | <1 | 0 |
| 30% TSP | 6 | Few | spot | <1 | 0 |

TABLE 40

| 10% MEK | Blister at scribe size | Frequency of Blisters | Rust Type | Surface Coverage (%) | Scribe delamination (%) |
|---|---|---|---|---|---|
| 0% TSP | 4 | medium dense | general | 5 | 20 |
| 15% TSP | 4 | Few | spot | <1 | 0 |
| 30% TSP | 4 | few | spot | <1 | 0 |

EXAMPLE XXI

Rust Conversion Coatings Produced from Waterborne TSP Dispersions:

Into a large stainless steel beaker was added 1 part E-Sperse 704 (weight solids) and 4 parts E-Sperse 703 (weight solids) both from Ethox chemicals. To this was added TSP. Subsequently water was added to ensure the solids of the final dispersion was 75% by weight TSP. Finally, the ingredients were mixed using a dispersator from Premier Mill Corp at 40% power for 3 minutes. The resultant dispersion was applied to a R-35 panel which had been exposed to a salt fog for 1 day. As the dispersion dried, the red rust ($Fe_2O_3$) was converted to black rust ($Fe_3O_4$). Black rust is formed in low oxygen environments. It is more stable and can inhibit further rust formation.

Conversions coatings and coatings with improved adhesion can be used to produce surface tolerant coatings these are used over marginally prepared surfaces (surfaces contains old paint and rust) and still provide adequate protection. This requires less surface prep reducing costs and money.

While not wishing to be bound by conjecture, TSP and DSP are hindered phenols. Hindered phenols are known to act as antioxidants and to act through an electron transfer mechanism. It is proposed that this mechanism causes the red rust to turn black. It also may aid in improving corrosion resistance of coatings. It is expected that coatings made with DSP or TSP could eliminate some or all of the corrosion inhibiting pigments. This may also reduce toxic metals in coatings such as Zinc, Zirconium, chromium, among others.

EXAMPLE XXII

Dispersion Capabilities of Pigments:

20 grams of inhibitive pigment (Heucophos ZMP from Huebach) was easily stirred into 50 g of TSP without the use of conventional dispersing equipment such as a high intensity Cowls blade dispersing blade. A typical method to measure the effectiveness of dispersing is to measure the fineness of grind with a Hegman gauge. The mixture had a Hegman of 8 which is the finest grind measurable with such a device. It is expected that many other types of pigments may also be dispersed using DSP or TSP, both inorganic and organic types of pigments.

EXAMPLE XXIII

DSP and TSP were evaluated in solvent borne epoxy mixtures for corrosion resistance. In these new mixes including benzyl alcohol, the effect of DSP and TSP on corrosion resistance was evaluated as a result of this study.

Further, an adduct hardener was made at a 4:1 weight ratio of XTA 801 to epoxy resin. XTA 801 is a mixture of 1,4 bis-(aminomethyl)cyclohexane (60-100%), imino-bis(4-aminomethyl-4'-cyclohexylmethyl) amine (13-30%), and 3-azabicyclo[3.2.2]nonane (1-3%), shown in FIG. 1 as A, B, and C, respectively. The adduct hardener is a solvent borne hardener that is combined with the solvent borne epoxy mixtures.

A BPA based epoxy resin from Hexion/Momentive, EPON 828, is used for the epoxy dispersion. XTA 801 from Huntsman International LLC was used to make a 4:1 XTA epoxy-adduct. Ancamine 2390 from Air Products was used as is as a commercial hardener. The additives used in this study are listed in Table 41 below, where BA is benzyl alcohol.

TABLE 41

Additives used in the study.

| Additive | Hydrophobe | EO | Actives |
|---|---|---|---|
| BA | — | — | 100 |
| DSP | DSP | 0 | 100 |
| TSP | TSP | 0 | 100 |

The epoxy mixtures were prepared prior to mixing with the two different hardeners. For the 4:1 XTA adduct hardener, epoxy mixtures to yield 0%, 7.4%, and 19.2% additive on weight of the total epoxy and hardener system were prepared. For the 0% no additive control mixture: to a ½ pint paint can, 250 g epoxy (EPON 828—Hexion/Momentive) was added followed by 25 g of benzyl alcohol, For 7.4% mixture: to a ½ pint paint can, 250 g epoxy (EPON 828—Hexion/Momentive) was added followed by 27.5 g of benzyl alcohol, and finally 25 g of additive. For 19.2% mixture: to a ½ pint paint can, 250 g epoxy (EPON 828—Hexion/Momentive) was added followed by 32.5 g of benzyl alcohol, and finally 75 g additive. The mixtures were mixed without entraining air with a stainless steel one blade mixer for ~20 minutes. All reagents were stored and mixed at constant temperature (23° C.).

Similarly, for the Ancamine 2390 hardener, epoxy mixtures to yield 0%, 4.6%, and 12.6% additive on weight of the total epoxy and hardener system were prepared. For the 0% no additive control mixture: to a ½ pint paint can, 250 g epoxy (EPON 828—Hexion/Momentive) was added followed by 25 g of benzyl alcohol, For 4.6% mixture: to a ½ pint paint can, 250 g epoxy (EPON 828—Hexion/Momentive) was added followed by 27.5 g of benzyl alcohol, and finally 25 g of additive. For 12.6% mixture: to a ½ pint paint can, 250 g epoxy (EPON 828—Hexion/Momentive) was added followed by 32.5 g of benzyl alcohol, and finally 75 g additive. The mixtures were mixed without entraining air with a stainless steel one blade mixer for ~20 minutes A solvent borne adduct was prepared. A 4:1 XTA epoxy adduct was made by adding 600 g of XTA to a large glass jar, followed by 150 g of epoxy. A stainless steel two blade stirrer was added to the jar and topped with a lid with a hole that allowed the stirrer shaft to protrude through and rotate freely. The adduct was allowed to stir and react for 8 hours at RT.

Using the epoxy equivalent weight of the epoxy mixture and the active hydrogen equivalent weight of the hardener, the appropriate amounts of the epoxy mixture and hardener adduct were added at a 1:1 equivalence ratio to a small paint can and mixed with a stainless steel one blade mixer for 3 minutes. Table 42 shows the breakdown for the mixtures prepared with 4:1 XTA. The blue shading indicates the epoxy mixture portion of the 2K mixture. The purple shading indicates the amount of 4:1 XTA hardener to react with the epoxy mixture, the total weight of the 2K mix, and the final additive amount as a weight % of the total weight of the 2K mix. In the final epoxy and hardener mixture, the benzyl alcohol is present at about 7.5% by weight.

TABLE 42

Epoxy and Hardener Mixtures for 4:1 XTA

| | BA (g) | Additive (g) | 828 (g) | Total (g) | wt % epoxy | EEW | 4:1 XTA (g) | 2K mix (g) | Additive wt. % 2K mix |
|---|---|---|---|---|---|---|---|---|---|
| Control | 25 | — | 250 | 275 | 0.91 | 206.8 | 64.63 | 339.63 | — |
| DSP-7.4% | 27.5 | 25 | 250 | 302.5 | 0.83 | 227.48 | 64.63 | 367.13 | 7.4 |
| DSP-19.2% | 32.5 | 75 | 250 | 357.5 | 0.70 | 268.84 | 64.63 | 422.13 | 19.2 |
| TSP-7.4% | 27.5 | 25 | 250 | 302.5 | 0.83 | 227.48 | 64.63 | 367.13 | 7.4 |
| TSP-19.2% | 32.5 | 75 | 250 | 357.5 | 0.70 | 268.84 | 64.63 | 422.13 | 19.2 |

Corrosion test panels were made by spray coating one side of R35 (0.8×76×127 mm steel) test panel with white Rustoleum Clean Metal Primer. The primer was allowed to dry for 2 days before the unprimed side of the test panel was coated with the epoxy hardener mixture. For each mixture, a 5 mil drawdown was made on the unprimed side of a primed test panel and allowed to dry for 7 days. After this period of time, the edges of the samples were taped with duct tape to prevent edge penetration of salt water. An X was scribed in the bottom half of the coated test sample. The samples were added to the salt fog box with the internal chamber temperature set at 35° C. and the saturator temperature at 47° C. with a spray rate according to ASTM B117-09. The samples were oriented with the test paint facing towards the atomizer and spraying was commenced.

Qualitative observations are to identify any trends or advantages or disadvantages of utilizing DSP and TSP in solvent borne 2K epoxy films. The corrosion panels made from the 4:1 XTA adduct are shown in FIG. 1. These samples were exposed for approximately 500 hours. TSP appears to resist corrosion better than DSP.

The contents of all references cited in the instant specifications and all cited references in each of those references are incorporated in their entirety by reference herein as if those references were denoted in the text While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting. It is to be understood that the terms used herein are merely descriptive rather than limiting and that various changes, numerous equivalents may be made without departing from the spirit or scope of the claimed invention.

What is claimed is:
1. A composition comprising:
   (a) about 0% to about 99% by weight of a polymeric resin; and
   (b) about 1% to about 100% an additive selected from the group consisting of: (i) a styrenated phenol composition containing by weight 18-29% distyrenated phenol, 0-3% monostyrenated phenol, 0-0.5% phenol, 0-0.5% styrene, 63-73% tristyrenated phenol, 0-0.5% water, wherein said styrenated phenol has an acid value of 0-2, a Gardner color of 0-5 and a viscosity@ 25 C of 43991 cps; and (ii) a styrenated phenol composition containing by weight 44-48% distyrenated phenol, 12-18% monostyrenated phenol, 0-1% phenol, 34-42% tristyrenated phenol, 0-0.5% water, wherein said styrenated phenol has an acid value of 0-2, a Gardner color of 0-3 and a viscosity@ 25 C of 2500 to 5000 cps; with the proviso that said resin is not a vulcanized rubber or a vinyl ester resin.

2. The composition of claim 1, wherein said polymeric resin is a thermosetting resin.

3. The composition of claim 1, wherein said polymeric resin is a thermoplastic resin.

4. The composition of claim 2, wherein said thermosetting resin is selected from the group consisting of polyesters, polyurethanes, phenol-formaldehyde resins, urea-formaldehyde resins, polybenzoxazines, bismaleimides, alkyd resins, melamine resins, epoxy resins, melamine -formaldehyde resins, polyimides, silicone; polyamide-imide, cyanate esters, poly-cyanurates and blends thereof.

5. The composition of claim 3, wherein said thermoplastic resin is selected from the group consisting of polyethylene terephthalate, polyproplyene, polycarbonate, polybutylene terephthalate, vinyl polymers, polyethylene, polyvinyl chloride, polyamide and blends thereof.

6. The composition of claim 4 wherein said resin is an epoxy resin.

7. The composition of claim 4 wherein said resin is a polyurethane resin.

8. The composition of claim 4 wherein said resin is a latex resin.

9. The composition of claim 4 wherein said resin is an alkyd resin.

10. The composition of claim 1, further comprising an additional solvent.

11. The composition of claim 10, wherein said additional solvent is an organic solvent.

12. The composition of claim 10, wherein said additional solvent is water.

13. The composition of claim 11, wherein said organic solvent is selected from the group consisting of benzyl alcohol, xylene and methyl ethylketone.

14. A composition comprising:
   (a) about 0% to 99% by weight of at least one resin wherein the resin is selected from the group consisting of epoxy, latex, polyurethane, polyurea, polyspartic, or alkyd resins;
   (b) about 1%-99% by weight of a styrenated phenol composition selected from the group consisting of: (i) 5%-35% by weight distyrenated phenol, about 0%-5% by weight monostyrenated phenol and about 50%-75% by weight of tristyrenated phenol and (ii) 40%-50% by weight distyrenated phenol, about 10%-20% by weight monostyrenated phenol and about 30%-40% by weight of tristyrenated phenol; and
   (c) optionally about 2% to 98% by weight of an additional solvent.

15. A dispersion comprising a dispersible polymer and the composition of claim 1.

16. A conversion coating comprising effective coating materials and the composition of claim 1.

17. A traffic marking paint incorporating the composition of claim 1.

18. A composite material comprising a fibrous material and the composition of claim 1.

19. The composite of claim 18, wherein said fibrous material is carbon fibers.

20. The composite of claim 18, wherein said fibrous material is glass fibers.

21. A cationic epoxy including the composition of claim 1.

22. A cationic acrylic including the composition of claim 1.

23. An asphaltic emulsion composition useful for roofing applications including the composition of claim 1.

24. A cement or concrete coating composition including the composition of claim 1.

25. A tubular material for pipeline applications including a coating material incorporating the composition of claim 1.

26. A marine antifouling coating composition including the composition of claim 1.

27. A fouling release coating including the composition of claim 1.

28. A metal coating composition including the composition of claim 1.

29. A method for preventing corrosion of a metal substrate which method comprises applying to said metal substrate a coating composition including the composition of claim 1.

30. A pigment dispersion including the composition of claim 1.

31. An intumescent composition including the composition of claim 1.

32. A coating with an extended overcoat time which including the composition of claim 1.

33. A wind blade for wind mill turbines incorporating the composition of claim 1.

34. An epoxy hardener or curing agent composition comprising:
   (a) at least one epoxy hardener or curing agent selected from the group consisting of diamines selected from orthoxylylenediamine, metaxylylenediamine, paraxylylenediamine, 1,2-bis(aminomethyl)-cyclohexane, 1,3-bis(aminomethyl)cyclohexane, and 1,4-bis(aminomethyl)cyclohexane and blends thereof and anhydrides selected from the group consisting of phthalic anhydride, ($C_1$-$C_{20}$ alkyl)phthalic anhydrides, tetrahydrophthalic anhydride, ($C_1$-$C_{20}$ alkyl)tetra-hydrophthalic anhydrides, hexa-hydrophthalic anhydride, ($C_1$-$C_{20}$ alkyl)hexa-hydrophthalic anhydrides, succinic anhydride, ($C_1$-$C_{20}$ alkyl)-succinic anhydrides, ($C_2$-$C_{20}$ alkenyl)succinic anhydrides, tetrabromophthalic-anhydride, 3,6-endomethylenetetrahydrophthalic anhydride, hydrogenated 3,6-endo-methylene-tetrahydrophthalic anhydride, 3,6-endomethylenemethyltetrahydrophthalic anhydride, hydrogenated 3,6-endomethylenemethyltetrahydrophthalic anhydride, trimellitic anhydride, $C_1$-$C_{20}$ alkyl nucleally substituted trimellitic anhydride; pyromellitic dianhydride; benzophenonetetra-carboxylic dianhydride, diphenyl-sulfonetetracarboxylic dianhydride, diphenyl ether tetra-carboxylic dianhydride, butane-tetracarboxylic dianhydride, ethyleneglycolbis(anhydro-trimellitate), glyceroltristrimellitic anhydride, poly(ethyloctadecane diacid)anhydride, poly-(phenylhexadecane diacid)anhydride, 1-isopropyl-4-methylbicyclo[2,2,0]octane-5-ene-2,3-di-carboxylic anhydride, hydrogenated 1 isopropyl-4-methylbicyclo[2,2,0]octane-5-ene-2,3-di-carboxylic anhydride, maleic-modified allo-ocimene, hydrogenated maleic-modified allo-ocimene, maleic-modified myrcene and hydrogenated maleic modified myrcene; and
(b) an additive selected from the group consisting of: (i) a styrenated phenol composition containing by weight 18-29% distyrenated phenol, 0-3% monostyrenated phenol, 0-0.5% phenol, 0-0.5% styrene, 63-73% tristyrenated phenol, 0-0.5% water, wherein said styrenated phenol has an acid value of 0-2, a Gardner color of 0-5 and a viscosity@ 25 C of 43991 cps; and (ii) a styrenated phenol composition containing by weight 44-48% distyrenated phenol, 12-18% monostyrenated phenol, 0-1% phenol, 34-42% tristyrenated phenol, 0-0.5% water, wherein said styrenated phenol has an acid value of 0-2, a Gardner color of 0-3 and a viscosity@ 25 C of 2500 to 5000 cps.

* * * * *